United States Patent [19]

Sakano

[11] Patent Number: 4,615,018

[45] Date of Patent: Sep. 30, 1986

[54] METHOD FOR WRITING DATA INTO A MEMORY

[75] Inventor: Yukio Sakano, Fuchu, Japan

[73] Assignee: Ricoh Company, Ltd., Tokyo, Japan

[21] Appl. No.: 592,594

[22] Filed: Mar. 23, 1984

[30] Foreign Application Priority Data

| Mar. 24, 1983 | [JP] | Japan | 58-49329 |
| Apr. 8, 1983 | [JP] | Japan | 58-61989 |
| Apr. 14, 1983 | [JP] | Japan | 58-66224 |
| Apr. 20, 1983 | [JP] | Japan | 58-69347 |

[51] Int. Cl.⁴ ............................................. G06F 12/00
[52] U.S. Cl. .......................................................... 364/900
[58] Field of Search ... 364/200 MS File, 900 MS File, 364/300; 365/189

[56] References Cited

U.S. PATENT DOCUMENTS 4,257,110  3/1981  Lamb et al. ............... 364/200 X

Primary Examiner—Raulfe B. Zache
Attorney, Agent, or Firm—Cooper, Dunham, Griffin & Moran

[57] ABSTRACT

The present method for writing data into a memory allows to write data to be written into the memory as extending between the two adjacent addresses by a single write command supplied from a system bus side thereby allowing to increase the writing speed and relax the burden on an associated software program.

10 Claims, 34 Drawing Figures

FIG.3a
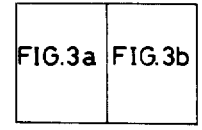
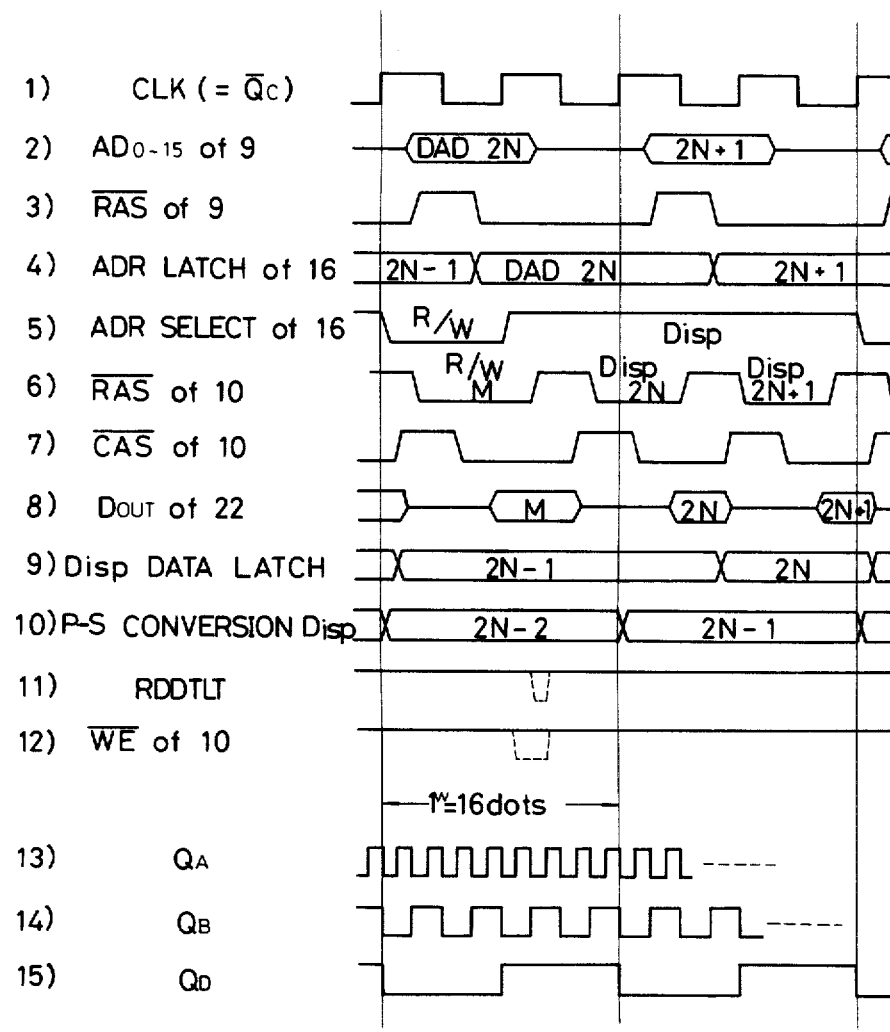

FIG.23
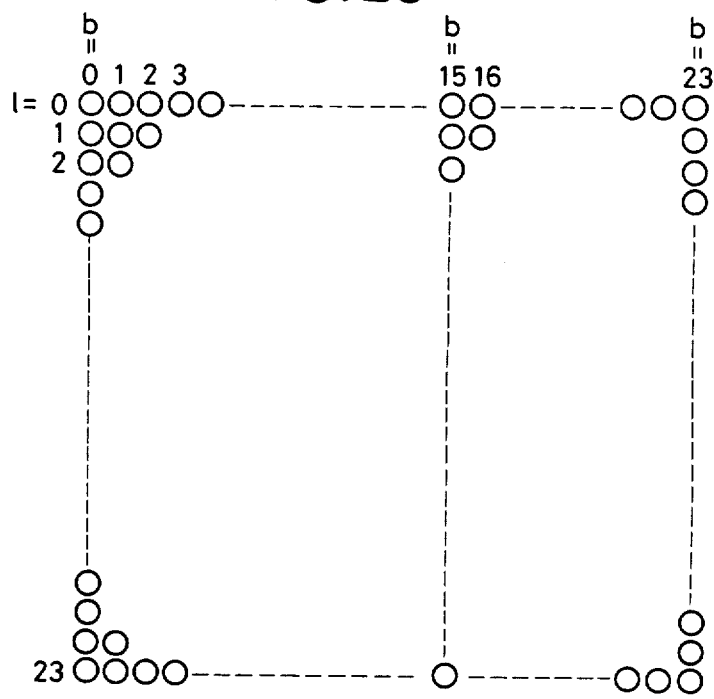
FIG.24
| 品名 | 鉛筆 |
FIG.25
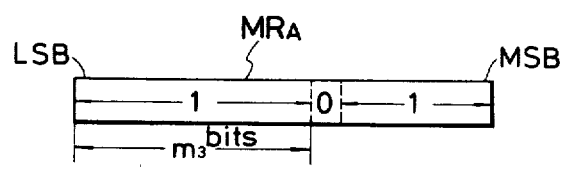

METHOD FOR WRITING DATA INTO A MEMORY

BACKGROUND OF THE INVENTION

1. Field of the Invention

This invention relates to a method for writing data into a data memory, such as a screen memory which is used in a CRT or plasma display device or a printer and in which data per pixel unit is stored, and particularly to a method for writing data into a memory capable of writing data with a word as a unit and of writing data at a high speed even if a so-called shift write operation, in which a pattern data is written extending between the two addresses, is required, thereby allowing to relax the burden on an associated software program and to increase system efficiency.

2. Description of the Prior Art

In data processing devices, such as office computers, word processors and personal computers, use is typically made of a CRT or plasma display device and, as an output device, various printers, such as wire-dot type impact printers, ink-jet printers and electrophotographic printers, for example, employing a laser beam, are used. In such display devices and printers, there is typically provided a data memory for processing input-/output data.

FIG. 1 shows in block form a system structure of a typical prior art office computer. As shown, the system includes a central processing unit (CPU) 1, an internal memory 2, an external memory 3, a keyboard 4, a CRT display device 5, a printer 6, a character pattern memory 7 and a system bus 8. In a data processing system such as an office computer, the CRT display device 5, keyboard 4, printer 6 and the external memory 3 like a floppy disc are connected to the CPU 1 via the system bus 8. Thus, when an operator desires to process the data stored in the external memory 3 or the data input through the keyboard 4, he or she carries out required operations by looking at the information displayed on the screen of CRT display device 5. Then, in accordance with various instructions fed through the keyboard 4, the CPU 1 controls the operations of various components.

In such a case, if it is desired to enhance the quality of graphic patterns and characters to be printed or displayed, then a memory having an unacceptably large capacity as compared with the prior art character code type processing system is required because data must be processed pixel by pixel. A read/write operation of data for such large capacity data memory is normally carried out under the control of a software program. However, such a software control requires a relatively long time period so that there is brought about a disadvantage of lowering the writing speed. Furthermore, in order to enhance the quality of displayed or printed information, it is necessary to arrange characters spaced apart at an appropriate spacing along a character line, and, thus, shift processing of data is also called for. If such shift processing has been implemented, the data to be processed by a word as a unit are almost always written extending between the two adjacent addresses. In such a case, the burden on an associated software program is also increased thereby causing a further reduction in processing speed.

Under the circumstances, in order to increase the data write-in speed even with the above-described shift processing operation, there is proposed a method for sharing the functions between software and hardware as described in a patent application, entitled "BIT IMAGE MEMORY PROCESSING SYSTEM", and filed in the Japanese Patent Office on May 6, 1982. According to the proposed method, the mask register and shift register is formed by hardware and its control is shared by software, whereby shift data is mask-processed and written into a memory and the similar processing is carried out also for shifted out data, so that data may be written into two addresses in two cycles in total. However, in such a method requiring two cycles, more software processing time is required correspondingly.

There is also proposed another method in which a shift operation of data is carried out by hardware and a control over mask operation and relation with the adjacent data is carried out by software. However, the burden on software is not significantly relaxed even in this method and there is a limit in enhancing the data writing speed.

SUMMARY OF THE INVENTION

It is therefore a primary object of the present invention to obviate the disadvantages of the prior art as described above and to provide an improved method for writing data into a memory.

Another object of the present invention is to provide an improved method for writing data into a memory capable of carrying out a data write-in operation at high speed by relaxing the burden on an associated software program.

A further object of the present invention is to provide an improved method for writing data into a memory capable of increasing the overall system efficiency of a data processing system.

A still further object of the present invention is to provide a method for writing data into a memory which allows to provide output information of high quality when displayed or printed.

Other objects, advantages and novel features of the present invention will become apparent from the following detailed description of the invention when considered in conjunction with the accompanying drawings.

BRIEF DESCRIPTION OF THE DRAWINGS

FIGS. 3a and 3b, when combined as illustrated in FIG. 3, illustrate a timing chart showing the condition in which a display read out operation and a read/write operation bypassing the CRT controller are carried out in a time sharing manner in the structure shown in FIGS. 2a and 2b;

FIGS. 20a-1 and 20a-2, when combined as illustrated in FIG. 20a, and FIGS. 20b-1 and 20b-2, when combined as illustrated in FIG. 20b, show timing charts which are useful for explaining the operation of I/O controller shown in FIGS. 19a and 19b;

FIG. 23 is a schematic illustration showing another dot matrix which corresponds to that of FIG. 5 and in which a character is formed by 24 dots×24 dots;

FIG. 24 is a schematic illustration showing the conceptual structure of screen memory in which data are stored such that a vertical ruled line is to be drawn between two Japanese characters "item" (left) and "pencil" (right);

FIG. 25 is a schematic illustration showing how data are set in the mask register when the ruled line of FIG. 24 is to be drawn;

DESCRIPTION OF THE PREFERRED EMBODIMENTS

Figure 1:
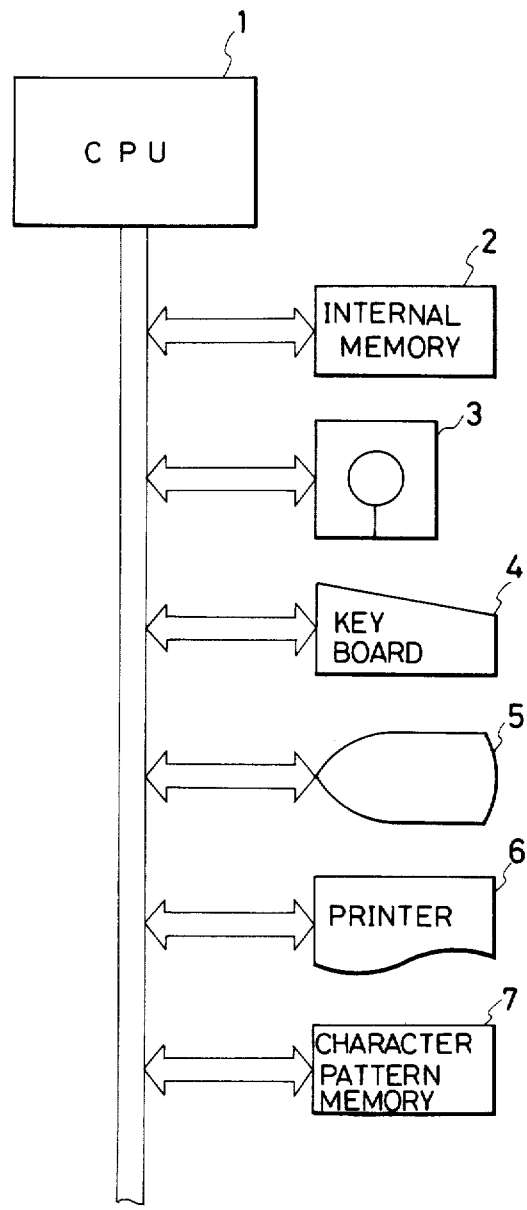
FIG. 1 is a block diagram showing a system structure of a typical prior art office computer.

In accordance with one aspect of the present invention, there is provided a data write-in method in a system comprising (1) a shift register which includes a first area and a second area and into which input data is set, (2) a mask register into which mask data indicating a shift amount of input data and (3) an address adder for generating a second address, for example (n+1), by adding a constant number to a first address n to be input, wherein after shifting the input data set in said shift register toward said second area according to the mask data set in said mask register, the data in said first area of said shift register (1) is written into a first address of a memory at a first timing and the data in said second area of said shift register (1) is written into a second address of said memory at a second timing. In this shift write operation, in response to a single write-in request (MWTC) from the system bus side, data is written in twice, e.g., once to address n and once to address (n+1), and the operation is terminated after sending an end signal (MRDY) to the system bus side. That is, in accordance with the present invention, a write operation for writing input data into a memory area extending between two addresses can be carried out just by a single write-in instruction.

In accordance with another aspect of the present invention, there is provided a data write-in method for carrying out a write-in operation by providing input data, its address and write-in instruction and a read out operation by providing an address and read-out instruction in a memory device including (1) a shift register which has a first area and a second area and in which data is set, (2) a mask register in which a mask data indicating a shift amount of input data is input, and (3) an address adder for adding a predetermined number to a first address n to be input to generate a second address such as (n+1); said method comprising the steps of reading out data stored in said first address of said memory after shifting the input data set in said shift register toward said second area in accordance with the mask data set in said mask register (2); forming first write-in data corresponding to the shift amount set in said mask register (2) from the data thus read out from said first address and the data in the first area of said shift register (1); writing said first write-in data thus formed into said first address of said memory at a first timing; reading out data stored in said second address of said memory; forming second write-in data corresponding to the shift amount set in said mask register (2) from the data thus read out from said second address and the data in the second area of said shift register (1); and writing said second write-in data thus formed into said second address of said memory at a second timing.

With this structure, in the case of writing or rewriting data for one character as stretched between the two adjacent addresses, for those data which do not require rewriting of memory area in the respective addresses, they are again stored into original areas after reading out and rewriting operations, and, thus, no change takes place due to writing of new data or rewriting.

In accordance with a further aspect of the present invention, there is provided a data write-in method for carrying out a write-in operation by providing input data, its address and write-in instruction in a memory device including (1) a shift register having a first area in which data is set and a second area, (2) a mask register in which a mask data indicating a shift amount of input data is set, (3) an address adder for adding a predetermined number to a first address n to be input to generate a second address such as (n+1) and (4) mask data judging means for judging the value of data set in said mask register (2); said method comprising the steps of writing data in said first area into said first address of said memory at a first timing after shifting the contents set in said shift register toward said second area in accordance with the mask data set in said mask register (2); and determining as to whether or not to write the data in said second area of said shift register (1) into said second address of said memory at a second timing.

With this structure, in the case of writing data of one character as extending between the two adjacent addresses, it is only necessary to provide a single write-in instruction, and yet if the data to be written in define a half-sized character and it fits into one address after shifting, the write-in operation for the next address may be omitted, thereby allowing to further increase the write-in speed.

In accordance with a still further aspect of the present invention, there is provided a data write-in method for carrying out a write-in operation by providing input data, its address and write-in instruction and a read out operation of stored data by providing an address and read out instruction under the control of a central processing unit (CPU) in a memory device in which data are written with a word as a unit and which includes a memory for storing therein data pixel by pixel, (1) a shift register having a first area in which data is set and a second area, (2) a mask register in which a mask data indicating a shift amount of input data is set, (3) an address adder for adding a predetermined number to a first address n to be input to generate a second address such as (n+1) and (4) mask data judging means for judging the value of data set in said mask register (2); said method comprising the steps of reading out data stored in said first address of said memory after shifting the contents set in said shift register (1) toward said second area in accordance with the mask data set in said mask register (2); forming a first write-in data in accordance with the value of data set in said mask register (2) from the data thus read out from said first address and the data from said first area of said shift register (1), writing said first write-in data thus formed into said first address of said memory at a first timing, and determining as to whether or not to write data into said second address of said memory in accordance with an output from said mask data judging means. If writing into said second address is not necessary, the write-in operation is terminated; on the other hand, if writing into said second address is necessary, the method further comprises the steps of reading out data stored in said second address of said memory; forming second write-in data in accordance with the value of data set in said mask register (2) from the data thus read out from said second area and the data from said second area of said shift register (1) and writing said second write-in data thus formed into said second address of said memory at a second timing.

Figure 2A:
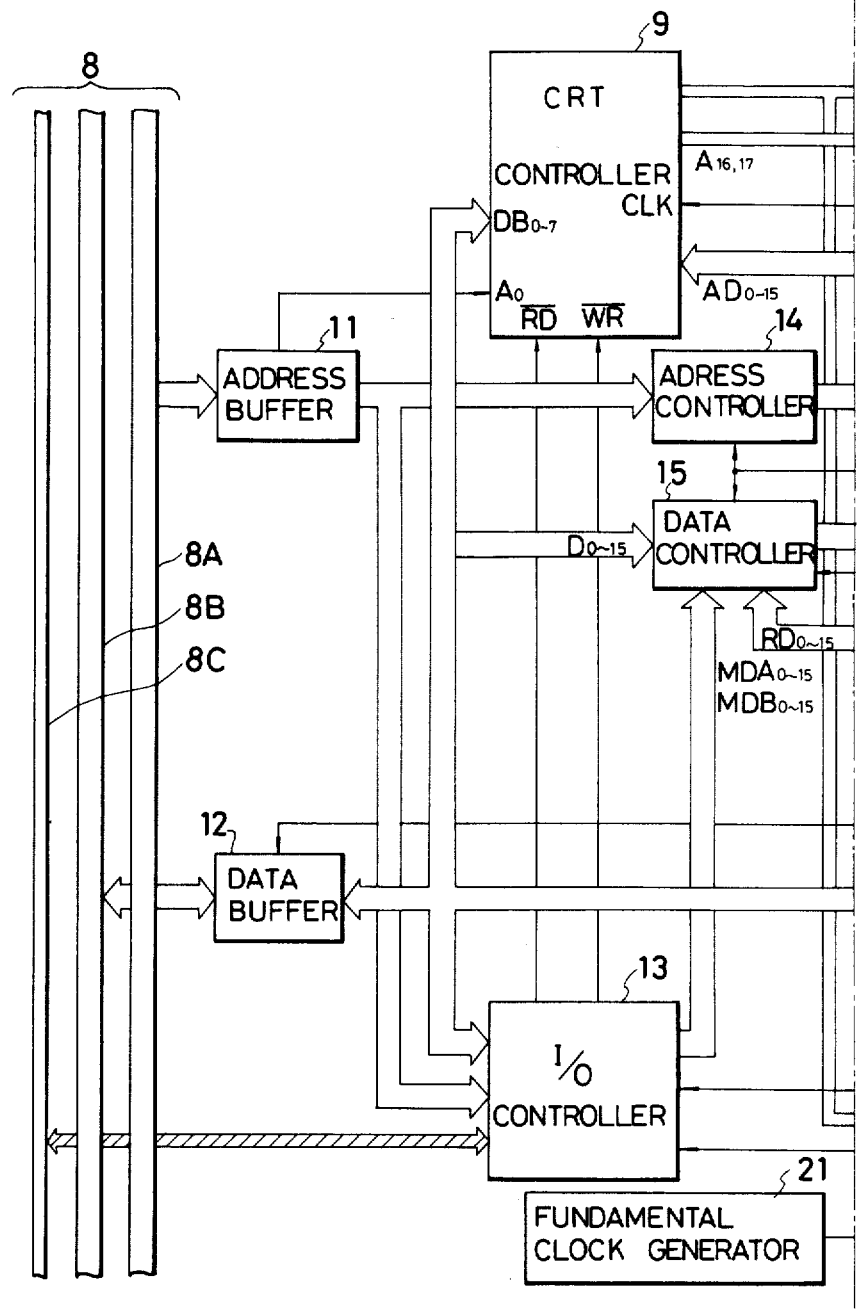
FIGS. 2a and 2b, when combined as illustrated in FIG. 2, illustrate in block form the internal structure of one embodiment of a CRT display device to which the present invention may be advantageously applied.
Figure 2B:
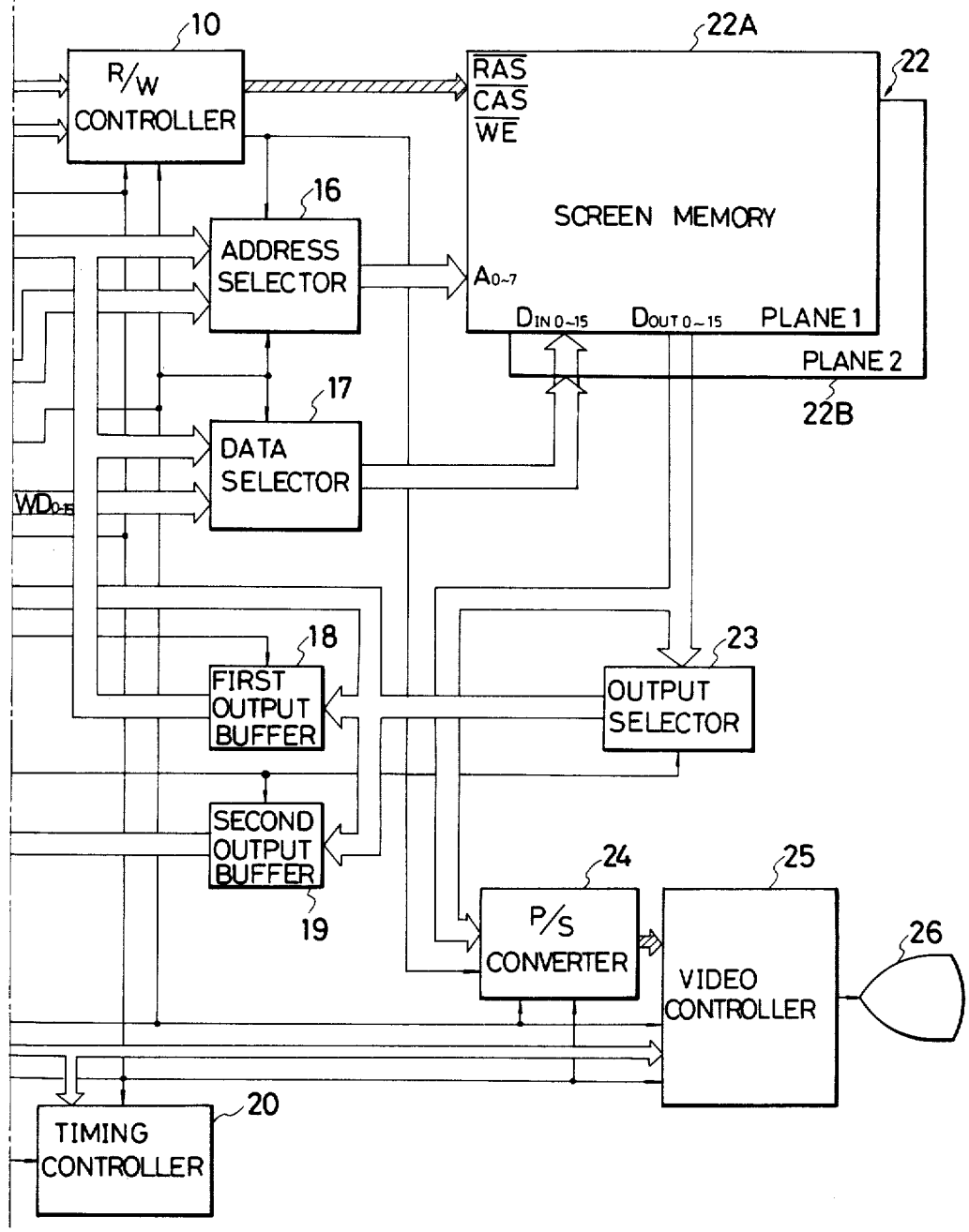
Figures 1, 20A:
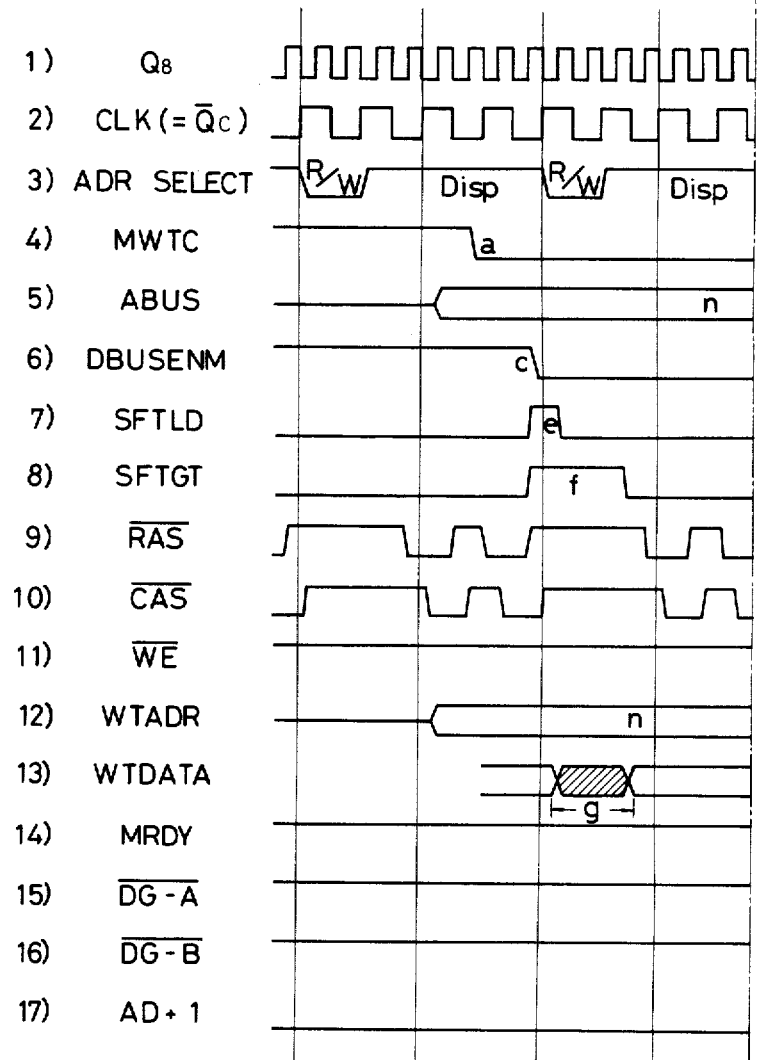
Figures 2, 20A:
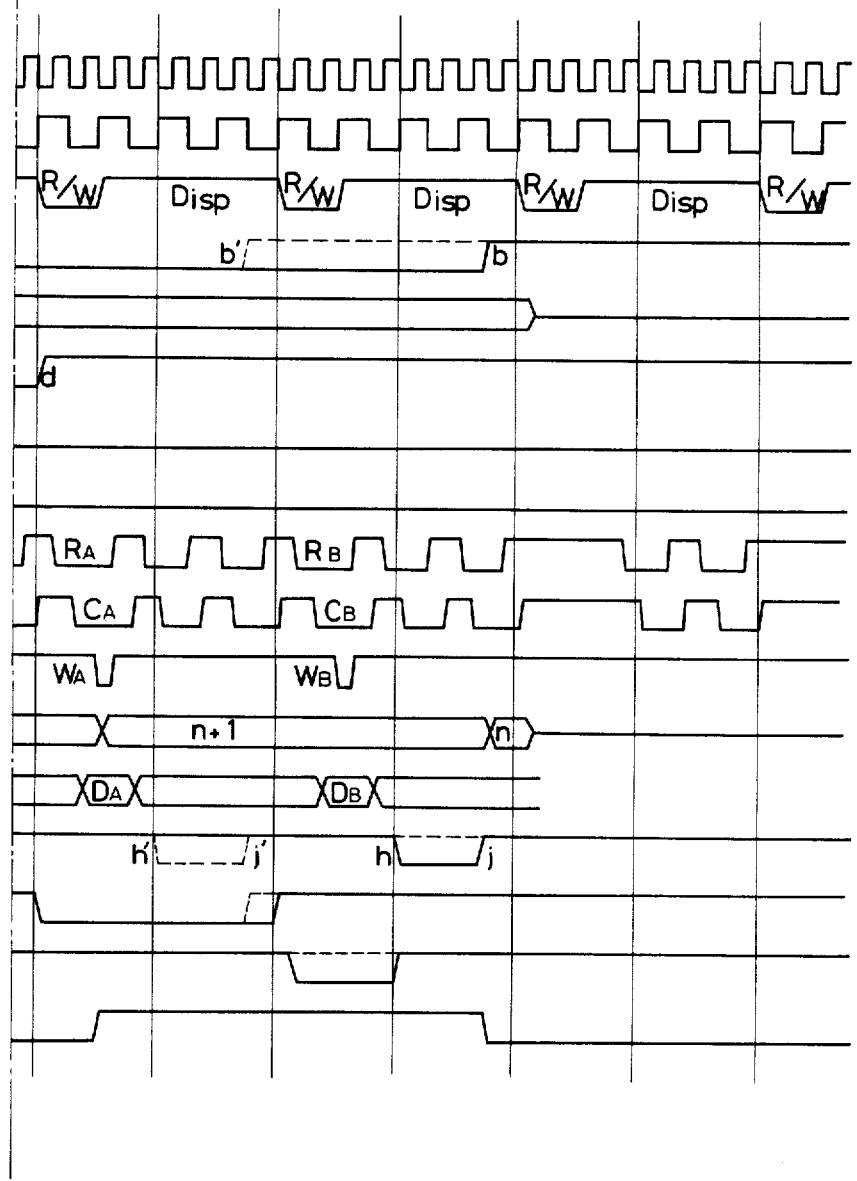

FIGS. 2a and 2b, when combined as shown in FIG. 2, show in block form one embodiment of the internal structure of a CRT display device which is particularly suitable for implementation of the present data write-in method, and this may be used as the CRT display device in the system of FIG. 1. As shown, the structure of FIGS. 2a and 2b includes a system bus 8 comprised of an address bus 8A, data bus 8B and control bus 8C, a CRT controller 9, a R/W (Read/Write) controller 10, an address buffer 11, a bidirectional data buffer 12, a mask register-incorporated I/O controller 13, an address adder-incorporated address controller 14, a data controller 15, an address selector 16 for carrying out a selection between an address from the address controller 14 and an address from the CRT controller 9 and a selection of row address and column address to provide an address to a screen memory 22, a data selector 17 for carrying out a selection between data from the data controller 15 and data from CRT controller 9 to provide data to the screen memory 22, a first output buffer 18 for providing an output from an output selector 23 to the CRT controller 9, a second output buffer 19 for providing an output from the output selector 23 to the data buffer 12, a timing controller 20 for supplying required clock and timing signals to each of the blocks, a fundamental clock generator 21, a screen memory 22 including a first plane 22A and a second plane 22B, an output selector 23 for providing an output by selecting one of outputs from the two memory planes 22A and 22B, a P/S (parallel-to-serial) converter 24 for subjecting the display data read out of the screen memory 24 to parallel-to-serial conversion, a video controller 25 for providing a video signal and synchronization signal, and a display unit 26 having a screen on which desired information is displayed.

CRT controller 9, in the first place, controls read and write operations of data into and from each of planes 22A and 22B of screen memory 22 on the basis of information supplied from address buffer 11, data buffer 12 and I/O controller 13. Second, CRT controller 9 carries out a so-called display read out operation in which addresses for reading out data from planes 22A and 22B on screen memory 22 are sequentially generated in synchronism with a synchronizing signal for display. Third, CRT controller 9 also generates synchronizing signals, such as horizontal sync signal and vertical sync signal, for use in a scanning operation in the display unit 26.

Screen memory 22 is comprised of a dynamic random access memory (RAM) and it is a memory for storing display data on a pixel by pixle basis and has a memory capacity capable of storing information of one frame or more. For this reason, its memory capacity is 10 to 20 times larger than a data memory which is used for processing data on the basis of character codes. In the structure shown in FIGS. 2a and 2b, only two planes 22A and 22B are shown, but it is to be noted that the number of planes may be determined arbitrarily.

Operations of the structure shown in FIGS. 2a and 2b may be generally classified into three groups: display operation; R/W operation with CRT controller 9; and R/W operation without CRT controller 9.

(1) Display Operation (1) An address for display read out is supplied to the address selector 16 from the CRT controller 9 in synchronism with a sync signal, i.e., raster.

(2) The address selector 16 latches the above-mentioned address in association with a timing signal from the R/W controller 10.

(3) Then, the address selector 16 supplies the address to the screen memory 22 in accordance with an address select signal from the R/W controller 10. During this, a selection of low and column addresses is also carried out in accosiation with a timing signal from the R/W controller 10.

(4) The R/W controller 10 supplies memory control signals required for display read out operation, i.e., $\overline{RAS}$ and $\overline{CAS}$ in this case, to the screen memory 22.

(5) The screen memory 22 then outputs data stored in a designated address.

(6) The output data from the screen memory 22 is once latched in the P/S converter 24 and then after having been subjected to parallel-to-serial conversion, it is supplied to the video controller 25 as a serial signal.

(7) The video controller 25 receives signals, such as horizontal sync signal, vertical sync signal and blank signal, from the CRT controller 9, and these signals and display data from the P/S converter 24 are controlled by control information from the I/O controller 13 and timing signals form the timing controller 20 thereby being supplied to the display unit 26 as video, horizontal sync, vertical sync signals to be displayed on the screen.

(2) Read/Write Operation with CRT controller

The structure shown in FIGS. 2a and 2b is capable of carrying out not only a normal Read/Write operation, but also a more complex Read/Modify/Write operation, in which read and write operations are included. Now, the Read/Modify/Write operation will be described below.

The Read/Modify/Write operation is an operation in which in response to a command from the system bus, e.g., a command to write in OR-processed data between current data B and newly designated data C into address A, required processing is carried out and its result is stored. It is to be noted that this R/W operation with the CRT controller takes place only during a blank period of the display device.

(1) Upon receipt of a command, the CRT controller 9 first generates an address which is then latched into the address selector 16.

(2) On the other hand, the CRT controller 9 supplies as its output information indicating the Read/Modify/Write operation to the R/W controller 10.

(3) In response to an address select signal from the R/W controller 10, the address selector 16 supplies the above-mentioned address to the screen memory 22. During this time period, a selection of row and column addresses is also carried out.

(4) The R/W controller 10 supplies control signals $\overline{RAS}$ and $\overline{CAS}$, which are necessary for read out operation, to the screen memory 22.

(5) The screen memory 22 then supplies as its output data stored in the designated address to the output selector 23.

(6) On the basis of a plane select signal from the I/O controller 13, the output selector 23 selects the output of either one of the planes among the output data from the screen memory 22 and supplies as its output.

(7) The output data from the output selector 23 is latched into the first output buffer 18 at a latch timing from the CRT controller 9.

(8) The CRT controller 9 switches to a mode in which the direction of address/data bus $AD_{0-15}$ is to allow data to be input into the CRT controller 9 thereby causing the data of first output buffer 18 to be supplied into the CRT controller 9.

(9) In accordance with command, the CRT controller 9 carries out writing of new data and modifications such as data inversion internally and supplies the resulting new data again to the address/data bus $AD_{0-15}$ as an output. At this time, the direction of the address/data bus is, of course, switched to an output mode.

(10) The output data from the CRT controller 9 is supplied to the data selector 17. At the data selector 17, a selection of data from the CRT controller 9 is carried out in accordance with a select signal from the I/O controller 13 and the thus selected data is supplied to the screen memory 22.

(11) To the screen memory 22 is supplied a control signal $\overline{WE}$, which is necessary for write-in operation, from the R/W controller 10, and new data is written into the above-mentioned address.

(3) Read/Write Operation without CRT controller (3-1) Read Operation (1) In response to a command to the I/O controller 13 from the system bus, the read mode of operation without CRT controller 9 is established and its information is also supplied to the R/W controller 10.

(2) At the address selector 16, in accordance with an address select signal provided through the I/O controller 13 and the R/W controller 10, a selection is made of an address which is given by a route including address bus 8A to address buffer 11 and to address controller 14, and it is supplied to the screen memory 22. In this case also, a selection of row and column addresses is also carried out in association with a timing signal from the R/W controller 10.

(3) From the R/W controller 10, control signals $\overline{RAS}$ and $\overline{CAS}$, which are necessary for read out operation, are supplied to the screen memory 22.

(4) From the screen memory 22, the data of the above address is supplied as an output to the output selector 23. Then, this data is latched into the second output buffer 19 in association with a timing signal from the R/W controller 10.

(5) In response to a signal from the I/O controller 13, the bidirectional data buffer 12 is set in a mode to supply its output to the system bus side, so that the data of second output buffer 19, namely read data, is output to the system bus.

(3-2) Write Operation (1) In accordance with a command from the system bus to the I/O controller 13, the write mode of operation without CRT controller 9 is established, and its information is also supplied to the R/W controller 10.

(2) Write in address is supplied to the screen memory 22 in a manner similar to the case of read out address described in (2) of (3-1).

(3) The data to be stored is supplied to the data selector 17 via a route from data bus 8B of system bus to data buffer 12 and to data controller 15. In this case, the direction of data buffer 12 is switched by the I/O controller 13 to a mode in which data may be supplied to the data controller 15.

(4) At the data selector 17, in response to a select signal from the I/O controller 13, data from the data controller 15 is selected and thus supplied to the screen memory 22.

(5) The control signal $\overline{WE}$, which is necessary for write-in operation, from the R/W controller 10 is supplied to the screen memory 22 and thus data is stored into the above-mentioned address.

(3-3) Shift Write Operation

This is also one of the write operations in which CRT controller 9 is bypassed and this operation differs from the previous operation (3-2) in that input data to be stored is first shifted over a desired amount by a shift register within the data controller 15 in accordance with the contents previously set in the mask register, and, then, a gate condition in compliance with the contents of the mask register is applied to the data thus shifted and the data read out of the screen memory 22 to form a new combined data, which is then stored into the screen memory 22.

The above-described operations (1) through (3) are the kinds of operations to access the screen memory 22. In the structure shown in FIGS. 2a and 2b, since use is made of a dynamic RAM as the screen memory 22, memory access for refresh is also carried out. In the structure shown in FIGS. 2a and 2b, other memory access operations than refresh operation are carried out under the following constraints.

(1) The R/W operation with CRT controller 9 is carried out only during a blank period.

(2) The R/W operation without CRT controller 9 is carried out during a display period as well as a blank period.

(3) The priority between the above-mentioned operations (1) and (2) is determined depending upon which has first undertaken memory access. In this case, a software program on the system bus side takes care that these operations (1) and (2) do not occur at the same time.

(4) The display read out operation (memory access for display operation) and the R/W operation without CRT controller 9 are carried out in a time sharing manner such that the R/W operation without CRT controller 9 is carried out once for twice of display read out operations.

Although it is a matter of course, the R/W operation without CRT controller 9 does not take place continuously at all times and it takes place only when a read or write request is made from the system bus side, in which case, the R/W operation is carried out in a time sharing manner with respect to the display read out operation.

Figure 3B:
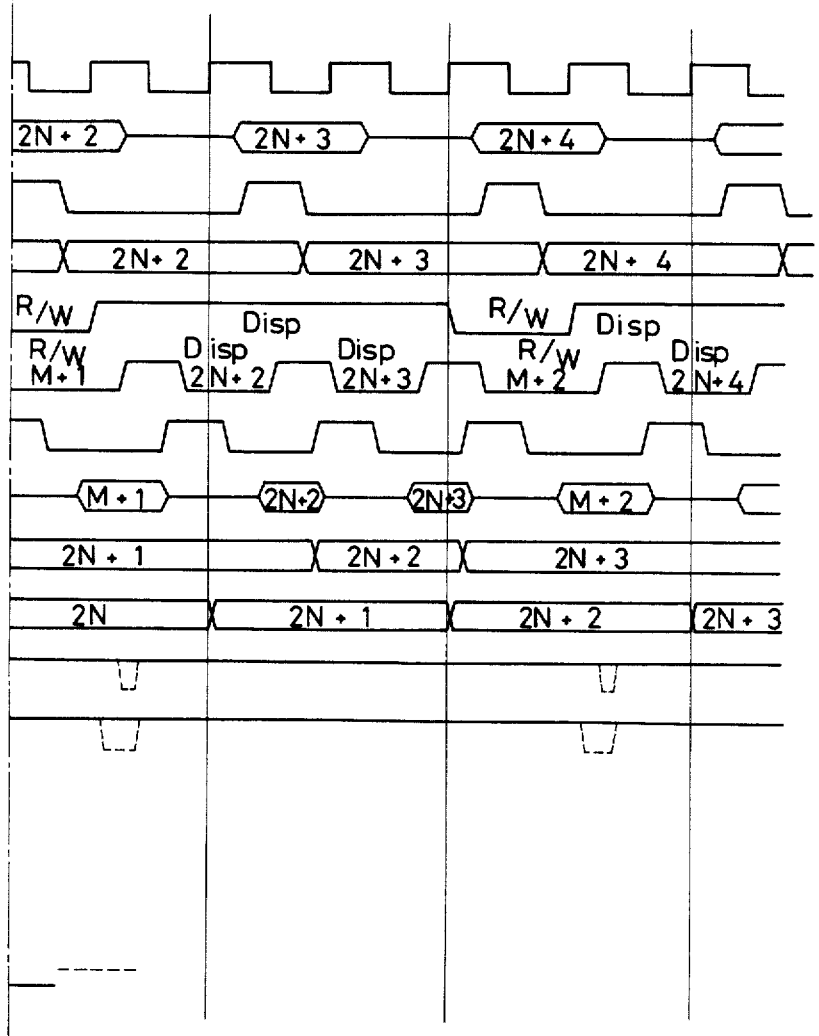

FIGS. 3a and 3b, when combined as indicated in FIG. 3, form a timing chart which indicates how the display read out operation and the R/W operation without CRT controller are carried out in a time sharing manner in the structure shown in FIGS. 2a and 2b. Each of the wave forms shown in the timing chart of FIGS. 3a and 3b will be described below.

(1) "CLK" is a clock signal to be supplied to the CRT controller 9 from the timing controller 20.

(2) "$AD_{0-15}$ of 9" corresponds to the address/data bus $AD_{0-15}$ in FIGS. 2a and 2b and it indicates that the memory address for display read out, i.e., display address DAD, proceeds successively as 2N, 2N+1, 2N+2, ... One address, e.g., DAD 2N, corresponds to 16 dots lined up on a single raster on the display screen, and address DAD proceeds once for every two clock signals CLK. That is, two clock signals CLK correspond to one address DAD and display data are output every 16 bits (=one word).

(3) "$\overline{RAS}$ of 9" is a signal supplied from the CRT controller 9 to the R/W controller 10 and to the timing controller 20, and it is used not only for the R/W control with respect to the screen memory 22 but also as a timing signal for having $AD_{0-15}$ latched.

(4) "ADR LATCH of 16" is a signal of a latch circuit provided in the interior of address selector 16 and it indicates a signal for latching output $AD_{0-15}$ of CRT controller 9 with the timing of falling end of $\overline{RAS}$ of (3).

(5) "ADR SELECT of 16" is an address select signal for selecting either an address from the CRT controller 9 or an address from the address controller 14, and it is supplied from the timing controller 20 to the address selector 16 and to the I/O controller 13. In the timing chart shown in FIGS. 3a and 3b, a period indicated by "Disp", or level "Hi", is an address select period from the CRT controller 9; whereas, a period indicated by "R/W", or level "Lo", is an address select period from the address controller 14.

(6) "$\overline{RAS}$ of 10" is a control signal for read/write to be supplied to the screen memory 22 and it is generated by the R/W controller 10 on the basis of a timing signal from the timing controller 20. In this $\overline{RAS}$, Disp 2N, Disp 2N+1, ... indicate memory access for display read out operation; whereas, R/W indicates memory access for read or write operation.

(7) "$\overline{CAS}$ of 10" is also a control signal for read/write operation similar to $\overline{RAS}$ of 10 in (6) above. $\overline{RAS}$ of 10 of (6) above and its paired $\overline{CAS}$ of 10 of (7) may be considered as memory access. Because, data may be read out of the memory 22 by providing $\overline{RAS}$, $\overline{CAS}$ and address information, and if a write enable signal $\overline{WE}$ is also provided, data may be written into the memory 22.

(8) "$D_{OUT}$ of 22" is read out data from the screen memory 22 and the data of its address is output if address, $\overline{RAS}$ and $\overline{CAS}$ are provided. In this timing chart, 2N, 2N+1, 2N+2, ... and M, M+1, M+2, ... indicate data output periods of respective addresses. It is to be noted that as mentioned previously the addresses M, M+1, M+2 in the R/W operation do not need by all means to proceed one at a time as indicated here, but they are shown in a successive manner here only for illustrative purpose.

(9) "Disp DATA LATCH" indicates the data which is originally the display read out data from the screen memory 22 and latched into a buffer within the P/S converter 24. This latch timing is supplied to the P/S converter 24 from the R/W controller 10.

(10) "P-to-S CONVERSION Disp" indicates timing in which the data of DATA LATCH of (9) is P/S-converted and displayed on the display unit 26 via the video controller 25. As shown in this timing chart, for internal processing and control in the P/S converter 24 and video controller 25, the data addressed by the CRT controller 9 in the $AD_{0-15}$ of (2) is displayed after having been shifted in time by two words (=32 dots).

(11) "RDDTLT" is a timing signal which gives latch timing of a memory output in the read operation of R/W operation.

(12) "$\overline{WE}$ of 10" is a memory control signal which is supplied from the R/W controller 10 at timing (W) during write mode in the R/W operation and it indicates timing to write input data.

(13)-(15) "$Q_A$" through "$Q_D$" are clock signals.

In this timing chart, memory access is carried out in a time sharing manner such that the R/W operation takes place once for every two display read out operations. The reason for this is that from the characteristics of the screen memory it is necessary to provide a certain period of time for memory access or its cycle time. If the memory used is sufficiently fast in operation, then it is possible to carry out the R/W operation for each display read out operation instead of carrying out the R/W operation for every two display read out operations. However, from the economical viewpoint, it is not advantageous to use such a high speed memory, and, moreover, since the scanning speed of a CRT display device is high, the cycle speed of display read out operation becomes fast, but memories capable of meeting such high speed specifications are not abundant in the present market, so that it is practical to adopt a system in which the R/W operation is carried out once for every two display read out operations. Memories usable in such a system may be easily selected without presenting any problems economically as well as functionally.

In "$\overline{RAS}$ of 10" of (6), timing with respect to "CLK" of (1) and "$AD_{0-15}$ of 9" of (2) differs between even-numbered ones, such as Disp 2N, and odd-numbered ones, such as Disp 2N+1. This is because, it is so structured that access to the memory is carried out at the timing which is optimum to the speed of the memory used, and its timing is controlled by the timing controller 20.

As described above, the display read out operation and the R/W operation without CRT controller are carried out in a time sharing manner in accordance with the present invention. In this case, the R/W operation without CRT controller may be carried out not only during a display period but also during a blank period. On the other hand, the R/W operation with CRT controller may be carried out only during a blank period.

Thus, during a blank period, it is checked at the system side such that there will be no collision in timing between the R/W operation with CRT controller and the R/W operation without CRT controller and thus they will not occur substantially at the same time. For example, the status of CRT controller is monitored at the system side, and if the CRT controller is not in the R/W operation, then a request for R/W operation without CRT controller is supplied to the CRT display device of FIG. 2. However, in the case where no such check is carried out or a collision occurs due to errors on the system side or the like, it is also possible to adopt a system in which priority is given to whichever has initiated its operation first in time.

That is, in the case where a request for the R/W operation without CRT controller is received while the R/W operation with CRT controller is in progress, the request is held in a stand-by condition until the R/W operation with CRT controller is completed and then the R/W operation without controller is set in operation. Conversely, during the R/W operation without CRT controller is in progress, even if a request for the R/W operation is supplied from the CRT controller, the on-going R/W operation without CRT controller continues its operation thereby invalidating the request from the CRT controller. Here, "invalidating the request" implies that even if the CRT controller itself operates as if it had carried out the R/W operation, memory access is not carried out to effectively disregard the request for the R/W operation. Such a control is carried out by the I/O controller 13, timing controller 20 and R/W controller 10.

It is to be noted that in the above description in order to facilitate understanding the principle of operation it is so structured that the read or write operation without CRT controller occurs always once for two display read out operations. However, in reality, the read or write operation is carried out only when there is a request for read or write operation from system bus side at the corresponding timing shown in the timing chart shown in FIGS. 3a and 3b. A request for read or write operation and a ready/busy response from the display device with respect thereto are carried out by transmission of signals between the control bus 8c and the I/O controller 10. In this case, the operating cycle at the system bus side, e.g., machine cycle of a microprocessor, and the operating cycle of the circuit shown in FIGS. 2a and 2b, e.g., display read out cycle, may be implemented asynchronously and thus independently of each other. Thus, in the CRT display device of FIG. 2, the display read out cycle may be set totally independently of the machine cycle at the system side, thereby allowing to carry out an asynchronous operation. For this reason, the respective components may be designed to meet respective optimum specifications so that efficiency of entire data processing system may be enhanced significantly.

As described previously, the data write-in method of the present invention has its object to enhance the system efficiency by providing a structure which allows to carry out the shift write operation by one instruction, which normally requires to receive a write-in instruction twice even if use is made of the R/W operation without CRT controller in the structure shown in FIGS. 2a and 2b. Described more in detail, the shift write operation, in which writing of data is carried out with a word as a unit and data of one character is to be stored as extending over the two adjacent addresses in the screen memory for storing data pixel by pixel, normally requires to carry out the write operation twice and thus a write instruction must be supplied twice, which increases the burden at the system side significantly and not simply twice.

In accordance with the present data write-in method, such a shift write operation may be carried out by a single write instruction or command. The shift write operation for storing data of one character into the two adjacent addresses as extending therebetween will now be described in detail below.

Figure 4:
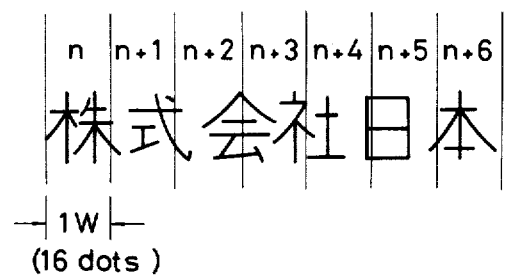
FIG. 4 is a schematic illustration showing the condition in which character data are written on a screen memory which is addressed by one word as a unit.

FIG. 4 is a schematic illustration showing diagramatically the condition in which character data, reading "CORPORATION JAPAN" in Japanese, are stored on the screen memory which is addressable with a word as a unit. In FIG. 4, n, n+1, n+2, . . . indicate addresses.

Figure 5:
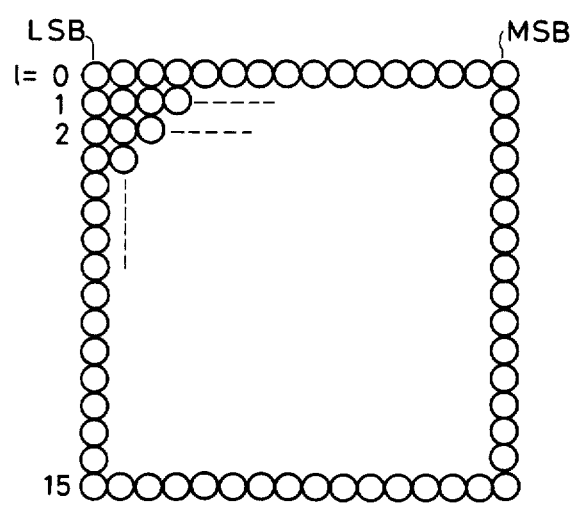
FIG. 5 is a schematic illustration showing a dot matrix for a character.

FIG. 5 shows a dot matrix for one character which is defined by 16 columns by 16 rows. In FIG. 5, 1=0, 1, 2, . . . , 15 indicate respective rows each defining a word having 16 bits. The dot matrix shown in FIG. 5 is used to define a single character and it, for example, corresponds to the leftmost character in FIG. 4.

In the case where one character has a width which corresponds to one word (=16 bits ) and the screen memory has an address which is equal to one word, as shown in FIG. 5, if data is written with a spacing between characters of, for example, 2 bits, it is often the case that one character extends between the two adjacent address areas, as indicated in FIG. 4.

Figure 6:
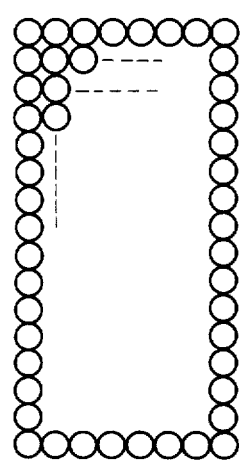
FIG. 6 is a schematic illustration showing another dot matrix for a half-sized character.

FIG. 6 shows another dot matrix which is used for forming a half-sized character and thus a character is defined by 8 columns by 16 rows.

Japanese and Chinese characters are typically defined by a 16×16 dot matrix of FIG. 5; whereas, alphanumeric characters and symbols are typically defined by a 8×16 dot matrix of FIG. 6. In the present specification, the characters defined by the dot matrix of FIG. 6 will be referred to as half-sized characters. Also in the case where the half-sized characters of FIG. 6 are inserted, there is a chance that the character of FIG. 5 is stored as extending between the tow adjacent address areas.

Figure 7:
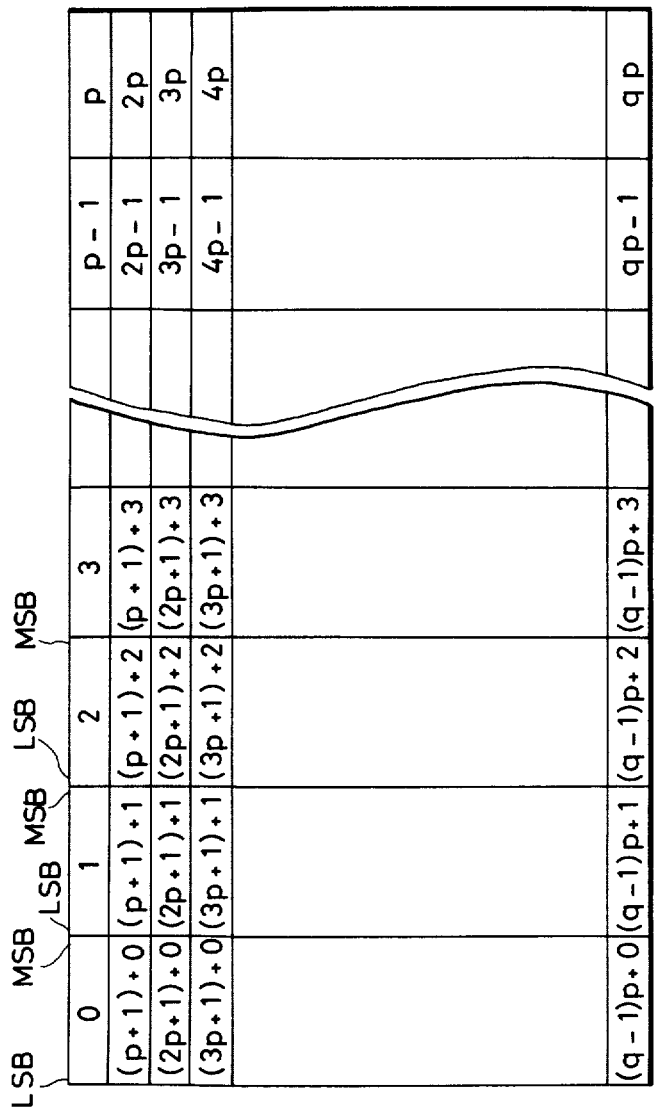
FIG. 7 is a schematic illustration showing the arrangement of addresses in the screen memory in contrast to the display screen.

FIG. 7 is a conceptual diagram schematically showing the arrangement of addresses of the screen memory in correspondence with the display screen. FIG. 7 indicates that addresses are given in the first row as 0, 1, 2, ..., p−1, p and addresses are similarly given in the other rows, as shown. And, in each address, 16 bit and thus one word pixel data which is to be displayed by 16 dots on the display screen is stored.

Assuming that the word at first row $1=0$ is to be stored into the 0th address in FIG. 7, the word at the 1th row $(1=0-15)$ is to be stored into the $(1p+1)+0$th address $(1=0-15)$, thereby completing the storage of all of the data of one character. That is, the storage of data for one character of FIG. 5 uses 16 row areas in the memory and thus it is necessary to provide write instructions for respective addresses. By repeating the write operation 16 times, one character of FIG. 5 may be written into the screen memory of FIG. 7.

However, in the case where the data of one character is to be stored as extending between the two adjacent addresses, as shown in FIG. 4, the memory area becomes twice as large so that such an operation is required to be repeated twice. Described more in detail with reference to FIG. 7, this occupies the area including addresses 0 through $(15p+1)+0$ and their adjacent addresses 1 through $(15+1)+1$ so that the data of one character are stored in an area of 16 bits × 16 rows in the occupied area of 32 bits × 16 rows. Thus, the shift write operation for storing the data of one character as extending between the two adjacent addresses requires an increased number of operations and makes its control complicated. For example, in the case where one character is defined by 16 bits × 16 rows, even if writing is carried out one word (=16 bits) by one word, it is necessary to carry out the writing operation repetitively by $16 \times 2 = 32$ times.

On the other hand, in accordance with the present method of writing data into a memory, the shift write operation for storing character data, input with one word as a unit, as extending between the two adjacent addresses is carried out by a single write-in command, thereby allowing to complete writing of the data of one character in 16 operations.

Figure 8:
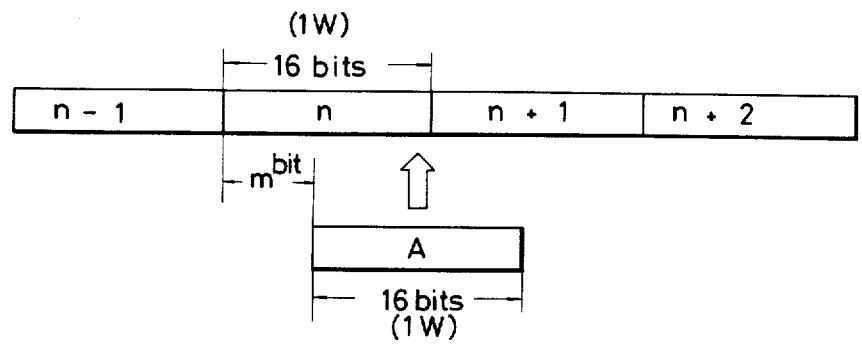
FIG. 8 is a schematic illustration showing the relation between four addresses (n−1)–(n+2) on the screen memory and data A to be written.

Now, with reference to FIG. 8, one mode of operation in accordance with the present invention for storing input data A of one word at a position shifted by m bits from the address boundary on the screen memory and thus extending between addresses n and (n+1). FIG. 8 shows the positional relation between the four addresses (n−1) through (n+2) on the screen memory and the data A to be stored. In FIG. 8, "m" indicates the number of shifted bits, i.e., shift amount, and $m=0-15$.

Figure 9:
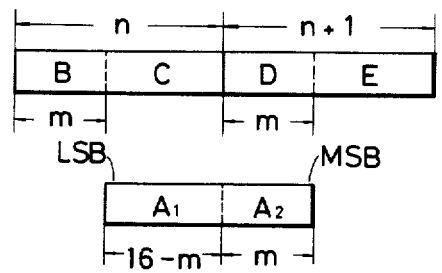
FIG. 9 is a schematic illustration showing in detail the contents in addresses n and (n+1) in the screen memory and the contents of input data A.
Figure 10:
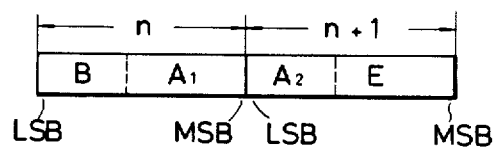
FIG. 10 is a schematic illustration showing the contents of addresses n and (n+1) when input data A has been written into the screen memory.

FIG. 9 shows in detail the contents of addresses n and (n+1) in the screen memory and the contents of input data A. As shown, B through E indicate the contents of data stored in addresses n and (n+1) in the screen memory and $A_1$ and $A_2$ are fragmentary contents of input data A. FIG. 10, on the other hand, shows the contents of addresses n and (n+1) when the input data A has been stored into the screen memory.

As will be obvious from a comparison between FIGS. 9 and 10, upon completion of writing of input data A, the contents of address n in the screen memory changes from C to $A_1$ and the contents of address (n+1) changes from D to $A_2$. However, the remaining contents B and E of addresses n and (n+1), respectively, remain unchanged. It will be easily appreciated that when such a write operation with one word as a unit is repetitively carried out 16 times, even if another character is substituted for the fourth character from the left in the example of FIG. 4, the characters on both sides, i.e., third and fifth characters from the leftmost character, remain unchanged and they are not influenced at all.

Returning again to FIGS. 8 through 10, when such substitution of data is to be carried out, a writing operation is carried out by providing address, $\overline{RAS}$, $\overline{CAS}$ and $\overline{WE}$, as described with reference to FIG. 3 previously. However, input of data to be stored is carried out by one word as a unit and access is carried out by one address as a unit on the screen memory. For this reason, in order to carry out the writing operation as described with reference to FIGS. 8 through 10, it is necessary to carry out a writing operation for address n and to address (n+1) so that the memory must be accessed twice, as repetitively explained above. That is, as a writing operation for address n, data B comprised of m bits (m=0-15) among the contents of address n and data $A_1$ comprised of (15−m) bits among input data A are combined to form a new one word data which is then stored into address n. Thereafter, it goes on to the step for writing data into address (n+1), in which data $A_2$ comprised of m bits at the most significant bit side of input data A and data E comprised of (15−m) bits at the most significant bit side among the contents of address (n+1) are combined to form a new one word data which is then written into address (n+1).

Figure 11:
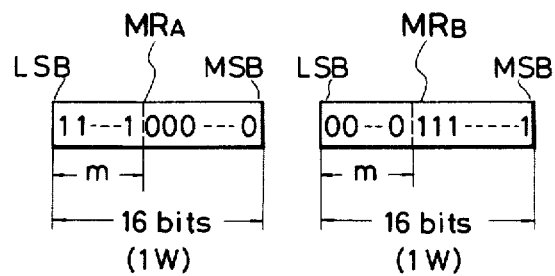
FIG. 11 is a schematic illustration showing, as an example, two mask registers and their contents, each comprised of one word, which are used in the shift write operation.
Figure 12:
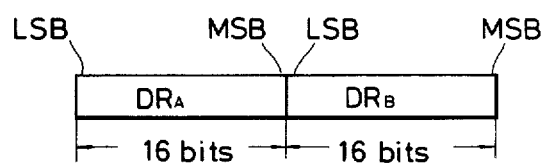
FIG. 12 is a schematic illustration showing two serially connected shift registers, each comprised of one word, which are used in the shift write operation.

Next, it will be described as to the mask register and shift register which are used for carrying out the above-described shift write operation. FIG. 11 shows two mask registers $MR_A$ and $MR_B$, each having one word structure, which may be used in the shift write operation, and their contents as an example. Such mask registers $MR_A$ and $MR_B$ are provided in the I/O controller 13 of FIG. 2. Then, in writing data into the screen memory 22, prior to a write-in command supplied from the system bus side, its contents is also supplied from the system bus side in advance and set in the mask registers $MR_A$ and $MR_B$. FIG. 12 shows a pair of serially connected shift registers $DR_A$ and $DR_B$, each having one word structure, which are also used in the shift write operation. These shift registers $DR_A$ and $DR_B$ are defined in the data controller 15. These shift registers have a function to retain input data and thus they are conventionally referred to as data registers. In accordance with the present data write-in method, use is made of a shift register for having data shifted over a desired distance.

When a write-in command is supplied from the system bus to the screen memory 20, input data of one word is set into the shift register $DR_A$ from the data bus 8B through the data buffer 12. The data of one word set in the shift register $DR_A$ is shifted to the other shift register $DR_B$ in accordance with the contents of the mask register. In the case of FIGS. 11 and 12, the data is shifted by m bits.

Figure 13:
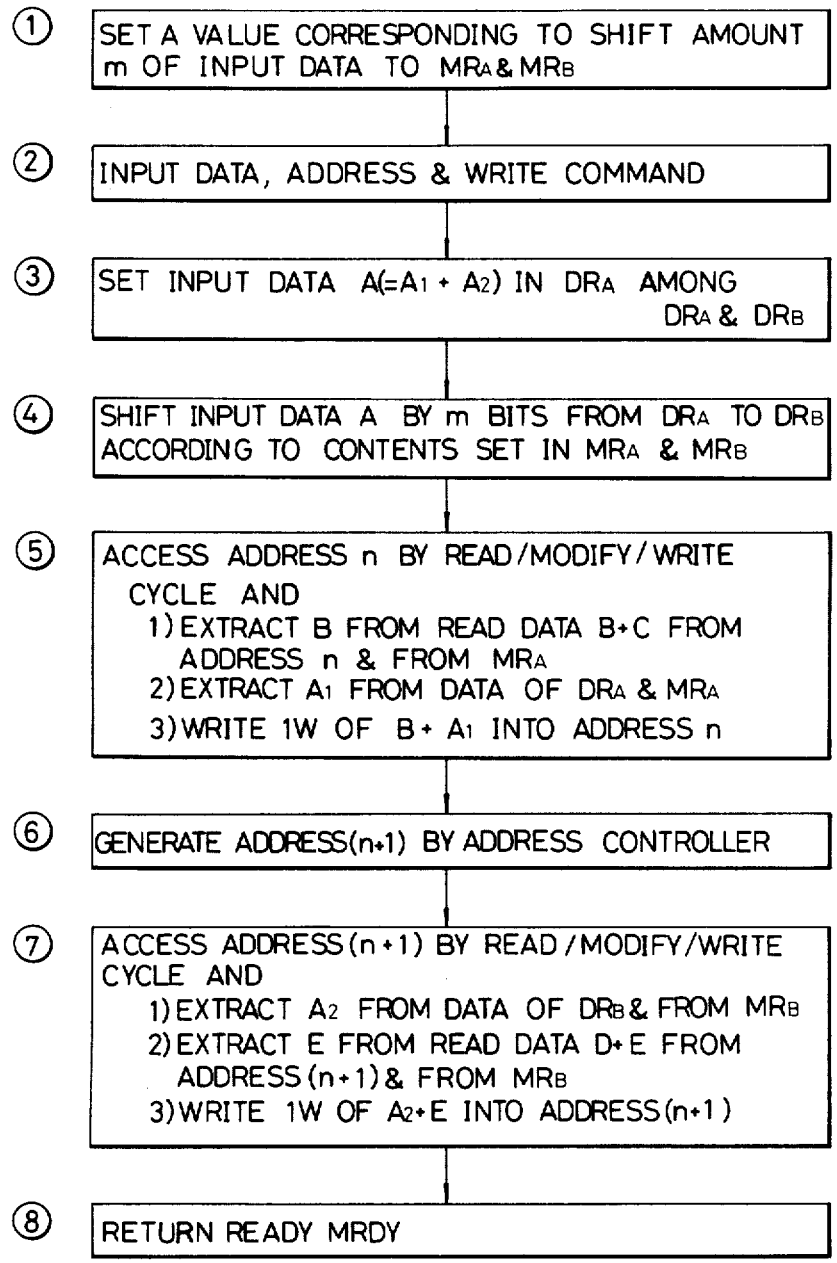
FIG. 13 is a flow chart showing the sequence of steps in carrying out the data shift write operation as illustrated in FIGS. 8 through 10 using the mask registers of FIG. 11 and the shift registers of FIG. 12 in accordance with the data write-in method of the present invention.

FIG. 13 shows a flow chart showing the sequence of steps in carrying out the shift write operation as shown in FIGS. 8 through 10 using the mask register of FIG. 11 and the shift register of FIG. 12 in accordance with the data write-in method of the present invention. In the flow chart shown in FIG. 13, the first two steps are carried out from the system bus side and the remaining steps are carried out from the CRT display device side shown in FIG. 2. In writing data following the sequence of steps shown in FIG. 13, steps 2 to 8 are carried out 1 times repetitively to complete writing of data of one character. For example, in the case of a character of 16 dots×16 dots, steps 2 to 8 are carried out 16 times repetitively to implement writing of 16 rows thereby completing to store the data of one character. And, thereafter, if it is desired to write data at a different location, the method proceeds from step 1.

In accordance with the present invention, it is so structured that steps 3 to 8 are all carried out by hardware thereby increasing the processing speed, and, in addition, writing of data into the screen memory 22 is carried out in a time sharing manner with the display read out operation as indicated in FIGS. 3a and 3b, which also contributes to increase the processing speed. For example, step 6 of adding address n to (n+1) is carried out by the address controller 14 to generate address (n+1). At steps 5 and 6, addresses n and (n+1) are accessed by the read/modify/write cycle. For this reason, it is only necessary to carry out memory access once.

Figure 14:
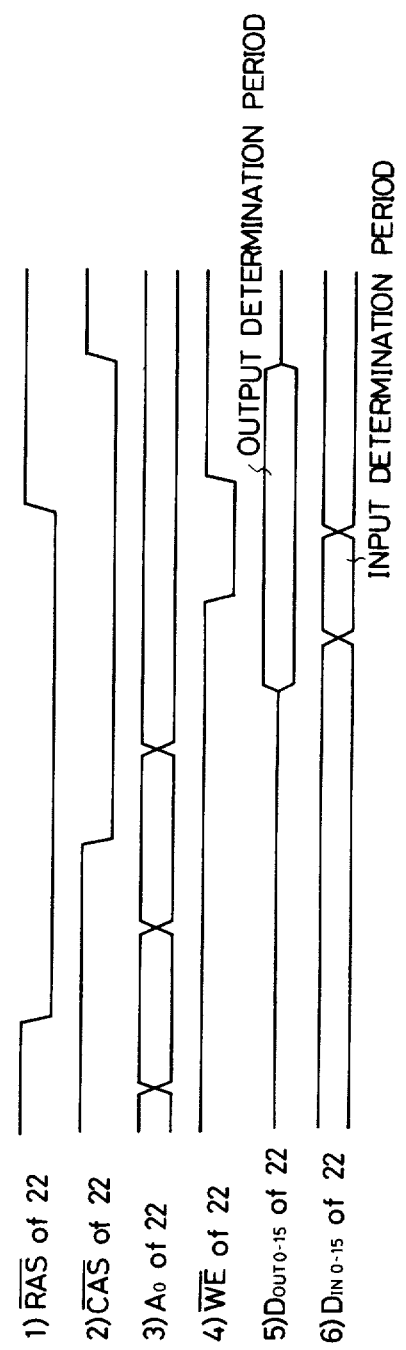
FIG. 14 is a timing chart which is useful for explaining the operation of a read/modify/write cycle.

FIG. 14 is a timing chart which is useful for explaining the operation of read/modify/write cycle. By generating $\overline{WE}$ at a predetermined timing with respect to $\overline{RAS}$ and $\overline{CAS}$, the contents of its address is read out at a timing faster than $\overline{WE}$ to provide its read out data or data which is formed by processing the read out data under predetermined conditions and controls. The read out data or formed data is then written into the address again at the timing of $\overline{WE}$. With the application of this read/modify/write operation, the operation described with reference to FIGS. 8 through 10 may be carried out by carrying out memory access twice, once to address n and once to address (n+1). However, the operation of FIG. 14 is not always essential and it is only sufficient to use this operation only when the fastest processing speed is desired.

As described with reference to the flow chart shown in FIG. 13, since address (n+1) may be generated at step 6, it is only necessary to provide a write-in command for address n once from the system bus side. Thus, in accordance with this data write-in method, the processing time at the system side and the number of transmission of signals between the system side and the CRT display device side are reduced, thereby allowing to increase the processing speed.

Next, it will be described as to the case in which a so-called half-sized character, which is defined by 8 columns×16 rows, is an input data in the shift write operation. In this case, when such a half-sized character is subjected to the shift write operation, there are two possibilities: one possibility in which the position of the character after shift is within address n and the other possibility in which the character after shift extends between the two adjacent addresses n and (n+1).

Figure 15:
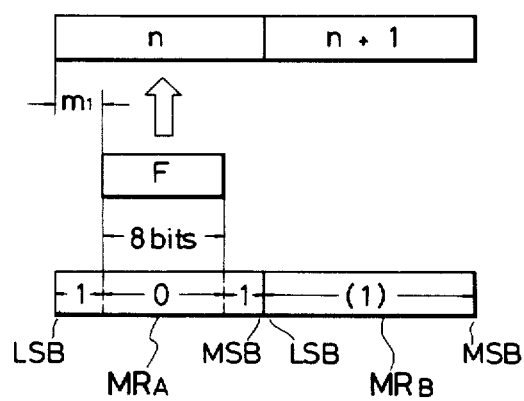
FIG. 15 is a schematic illustration showing the relation among addresses n and (n+1), input data and mask register in the case where the half-sized character may be stored into address n in its entirety after shift.

FIG. 15 is a schematic illustration showing the positional relation among addresses n and (n+1) of screen memory, input data F and mask registers $MR_A$ and $MR_B$ in the case when the half-sized character after shift falls completely within address n. In the case of FIG. 15, the least significant bit LSB of input data F is to be stored into a position shifted by $m_1$ bits from the boundary of address n in the screen memory. In such a case where the input data F after shift only requires rewriting of address n and not of address (n+1), it is only necessary to provide the data to the mask register $MR_A$. Thus, since the contents of mask register $MR_B$ is irrelevant, it is indicated by (1) in FIG. 15. That is, in the case of FIG. 15, since at least one bit of most significant bit MSB of mask register $MR_A$ becomes "1", it may be judged that only rewriting of address n is required by this single bit of MSB.

Figure 16:
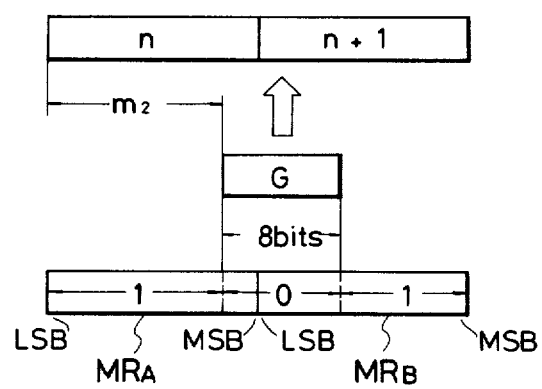
FIG. 16 is a schematic illustration showing the relation among addresses n and (n+1), input data and mask register in the case where the half-sized character is located extending between the two adjacent addresses n and (n+1)

FIG. 16 illustrates the case in which a half-sized character G after shift is located between addresses n and (n+1). In the case when the input data G is shifted to a position with its left-hand side separated away from the boundary of address n by $m_2$ bits thereby extending between the two adjacent addresses n and (n+1), the contents of address (n+1) must also be rewritten in a manner similar to the one described with reference to FIGS. 8 through 10. In this case, this condition may be judged by finding the fact that one bit of MSB of mask register $MR_A$ becomes "0".

Figure 17:
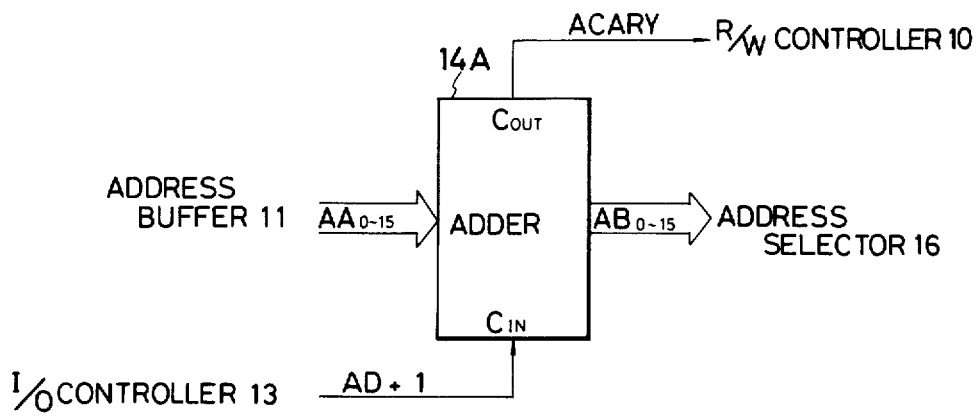
FIG. 17 is a functional block diagram showing the detailed structure of address controller.

FIG. 17 is a functional block diagram showing in detail one embodiment of the address controller, in which 14A indicates an adder. Thus the address controller 14 is, in principle, an adder. The address controller 14A receives an input address $AA_{0-15}$ as supplied from the address buffer 11 and an output address $AB_{0-15}$ is supplied to the address selector 16. A control signal AD+1 is supplied from the I/O controller 13 to control the operation of the adder 14A. The adder 14A supplies $AA_{0-15}=AB_{0-15}$ if AD+1=0 (level "Lo") and $AA_{0-15}+1=AB_{0-15}$ if AD+1=1 (level "Hi"). The adder 14A supplies a carry out signal ACARY which is a control signal supplied to the R/W controller 10. The carry out signal ACARY functions such that $AB_{0-15}=(FFFF)_H$ and ACARY=1 if $AA_{0-15}=(FFFF)_H$ and AD+1=1.

If ACARY=1, this control signal functions at the R/W controller 10 such that no $\overline{WE}$ signal is to be generated. The reason for this is to protect the data to be written in $(FFFF)_H+1$ from being written in $(FFFF)_H$ since the capacity of screen memory 22 is up to $(FFFF)_H$. In FIG. 17, although the number of address lines is indicated by 16, it may, of course, be a different number depending upon the capacity of screen memory and it may, for example, be 20 as $AA_{0-19}$.

Figure 18:
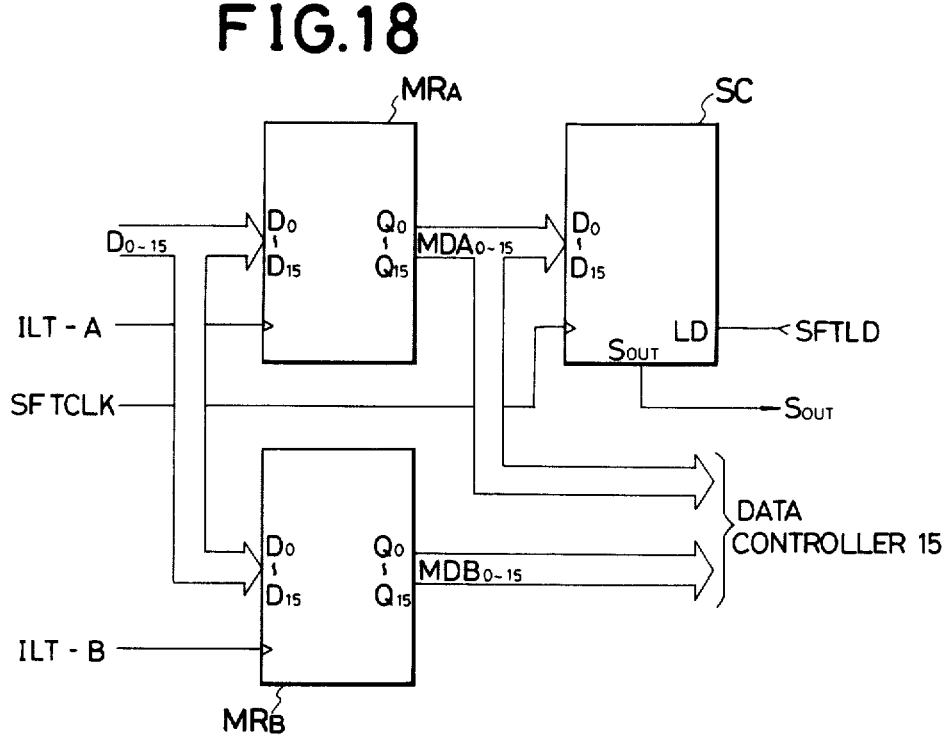
FIG. 18 is a functional block diagram showing the derailed structure of mask register and shift controller.

FIG. 18 illustrates the detailed structure of mask register and shift controller, in which $MR_A$ and $MR_B$ indicate mask registers and SC indicates a shift controller. As shown, signals ILT-A and ILT-B are data latch timing signals for latching mask data from the data bus side at the time of setting the mask registers and they are generated within the I/O controller 13. A signal SFTLD is a signal which is generated only during a time period for loading input data into the data register $DR_A$ within the data controller 15 and a time period for clearing $DR_B$, and this signal is also supplied to the shift controller SC. SFTCLK is a shift clock to be supplied to the data controller 15 and it is also supplied to the shift controller SC simultaneously.

Mask data $D_{0-15}$ are set in the mask register $MR_A$ by the timing signal ILT-A and mask data $D_{0-15}$ are set in the mask register $MR_B$ similarly by the timing signal ILT-B. Setting of mask registers $MR_A$ and $MR_B$ is carried out prior to a write-in request MWTC. This setting, however, does not need to be carried out for every write-in request MWTC, as explained with reference to the flow chart shown in FIG. 13.

As an example, it will be described as to the case in which a character defined by a dot matrix of 16 columns by 16 rows is to be stored with its one word at 1=0 being written in as extending between addresses 2 and 3 of screen memory of FIG. 7. In this case, as described with reference to FIGS. 8 through 11, the mask registers $MR_A$ and $MR_B$ are set. Then, with address 2 supplied to address bus 8A and one word at 1=0 of FIG. 5 supplied to data bus 8B, write request signal MWTC is supplied to the CRT display device from the control bus 8C. In this manner, with one word at 1=0 shifted by m bits as in FIG. 10, the data is written as extending between addresses 2 and 3. Upon completion of write operation, a response signal MRDY is returned to CPU via the system bus. Then, without carrying out setting of mask registers and thus keeping the mask registers intact, it is only necessary to supply address $(p+1)+2$ to the address bus, one word at 1=1 in FIG. 5 to the data bus and the write request signal MWTC to the control bus. Similarly, without changing the contents of the mask registers, addresses $(2p+2)$ through $(14p+2)$ and words at 1=2 through 14 are supplied one by one. Finally, address $(15p+1)+2$ is supplied to the address bus with one word at 1=15 in FIG. 5 supplied to the data bus and the write request signal MWTC supplied to the control bus. In this manner, by supplying the write request signal MWTC 16 times, the single character in FIG. 5 may be stored into a desired position of the screen memory, i.e., a position shifted by m bits and extending between addresses 2 and 3.

The shift controller SC is a circuit for controlling a shift amount of shift registers $DR_A$ and $DR_B$ in the data controller 15 depending on the contents of the mask registers. This shift controller SC is comprised of a parallel-in-serial-out shift register and when the signal SFTLD is "Hi", mask information $MDA_0$ through $MDA_{15}$ from the mask register $MR_A$ is loaded in parallel by the clock SFTCLK. Then, after having been shifted by the clock SFTCLK, the mask information $MDA_0$ through $MDA_{15}$ is supplied as a serial output from an output terminal $S_{OUT}$. If the mask data as shown in FIG. 11 is set in the mask register $MR_A$, the shift operation is carried out until the output from $S_{OUT}$ becomes "1", thereby counting the number of "0" bits or determining $(16-m)$ to detect shift amount m.

Figure 19A:
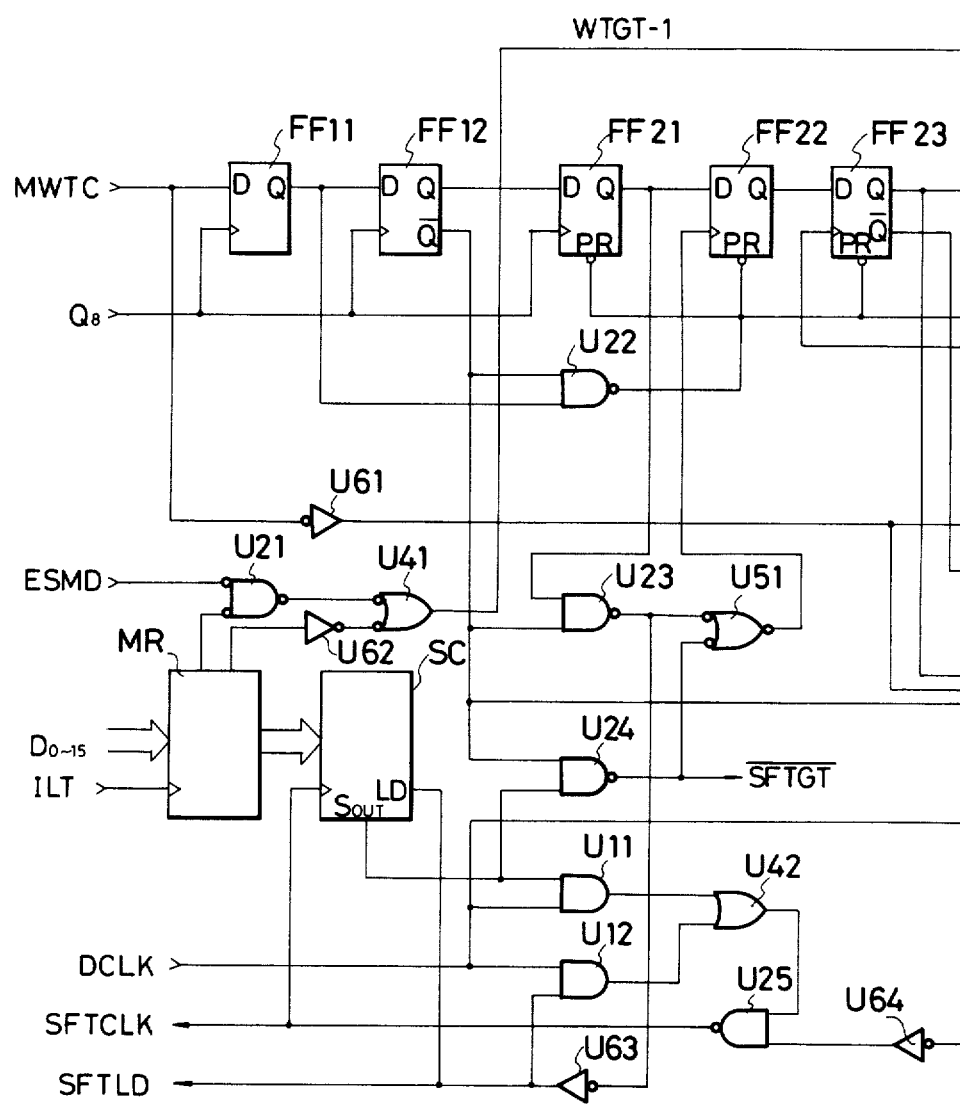
FIGS. 19a and 19b, when combined as illustrated in FIG. 19, show the detailed structure of I/O controller.
Figure 19B:
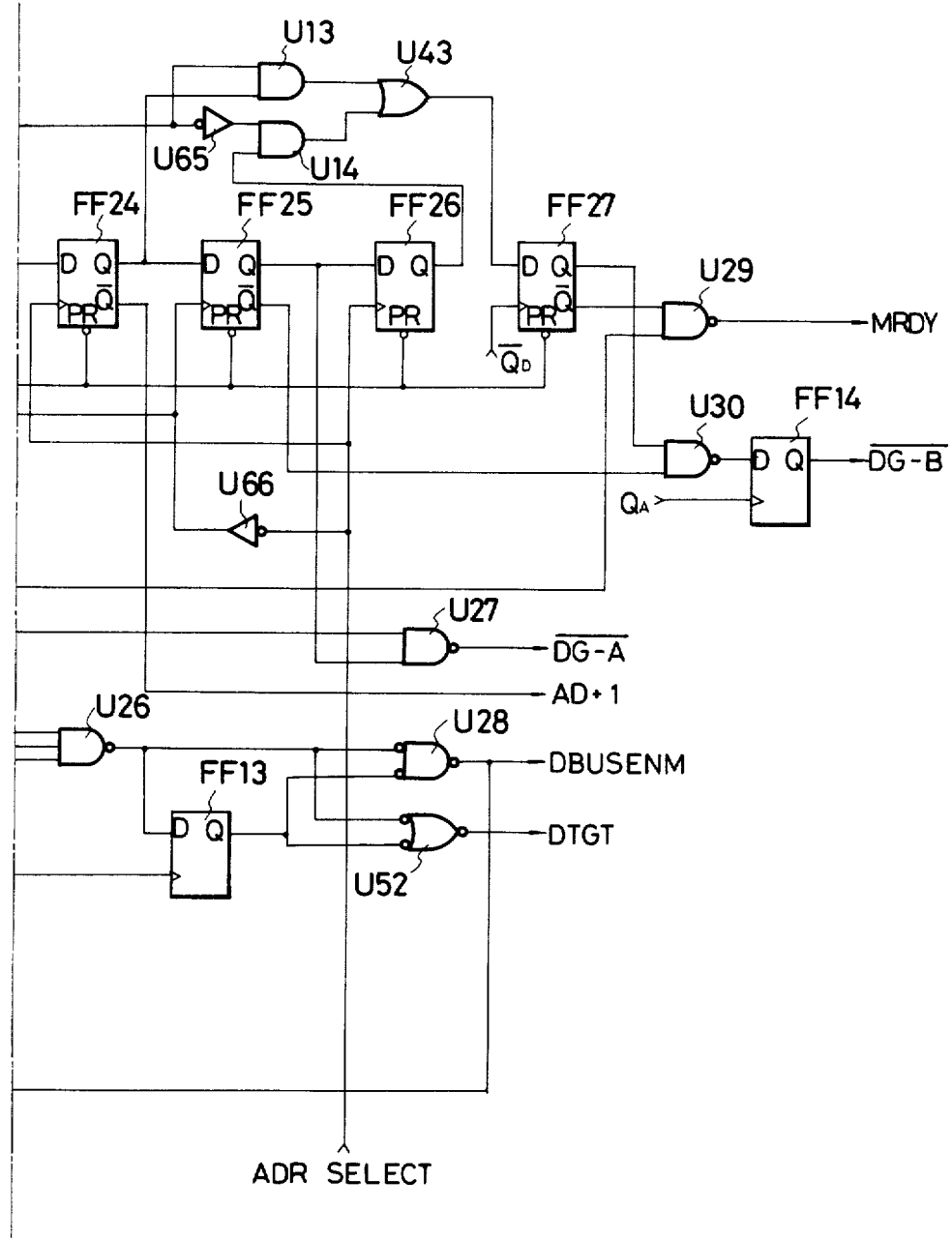
Figures 1, 20B:
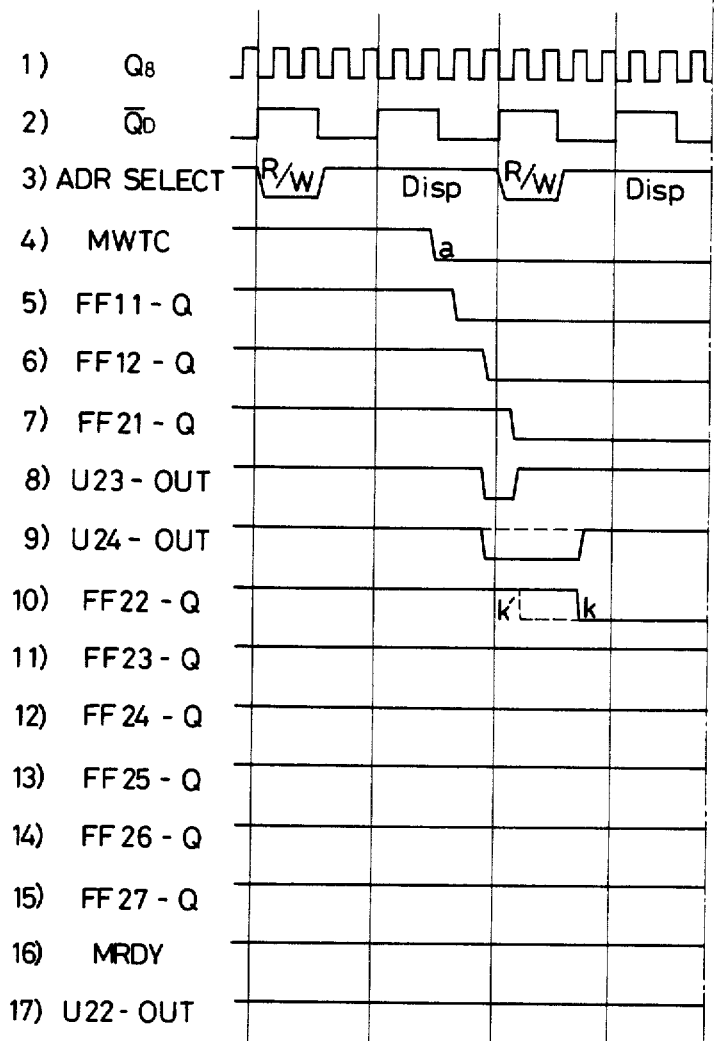
Figures 2, 20B:
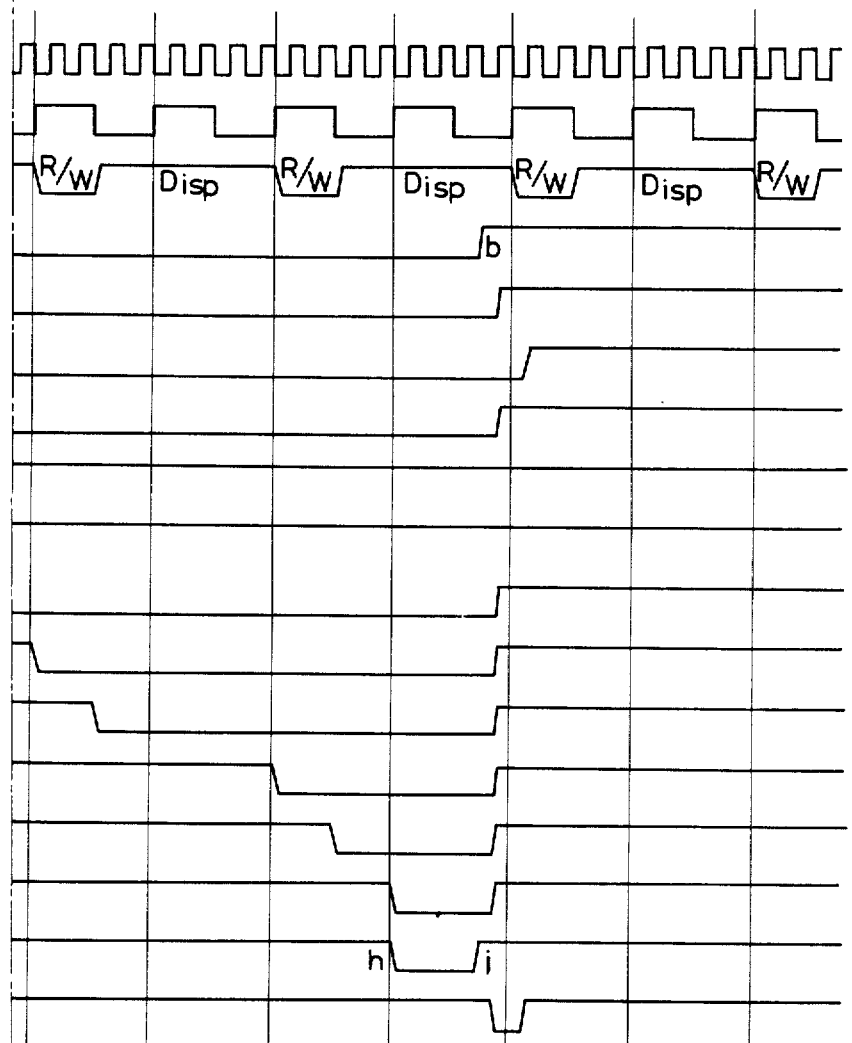

FIGS. 19a and 19b, when combined as indicated in FIG. 19, show the detailed structure of the I/O controller 13 and it illustrates a portion which is relevant to the present data write-in method. As shown, it includes a mask register MR comprised of a pair of mask registers $MR_A$ and $MR_B$, a shift controller SC comprised of a shift register, D flipflop circuits FF11-FF14, preset D flipflop circuits FF21-FF27, AND gates U11-U14, NAND gates U21-U30, OR gates U41-U43, NOR gates U51-U52 and inverters U61-U66. FIGS. 20a-1 and 20a-2, when combined as indicated in FIG. 20a, and FIGS. 20b-1 and 20b-2, when combined as indicated in FIG. 20b, show timing charts which are useful for explaining the operation of the I/O controller 13 illustrated in FIGS. 19a and 19b. The reference characters for various wave forms shown in FIGS. 20a and 20b correspond to the identical reference characters shown in FIG. 19. The reference characters for various wave forms shown in FIG. 20a have the following meaning.

(1) "$Q_B$" is a timing signal which corresponds to (14) of FIG. 3 and it is supplied from the timing controller 20.

(2) "CLK=$\bar{Q}_C$" is a clock signal which corresponds to (1) of FIG. 3.

(3) "ADR SELECT" is an address select signal which corresponds to (5) of FIG. 3 and it is supplied from the timing controller 20.

(4) "MWTC" is a signal which is supplied from the control bus 8c of system bus to the I/O controller 13 and which is a write request or command signal to the screen memory 22, starting at time a and terminating at time b. A time period b' indicated by the dotted line indicates a termination point when the write operation to address $(n+1)$ is omitted in the case of a half-sized character.

(5) "ABUS" indicates that address n is applied to the address bus 8A.

(6) "DBUSENM" is an enable signal of data bus 8B and it is used as a gate signal for controlling an output from the data buffer 13 to be valid or invalid. This signal is generated from time c till time d by the I/O controller 13 of FIG. 19.

(7) "SFTLD" is a pulse signal to be supplied to the data controller 15 and it indicates a time period for loading input data into shift register $DR_A$ and a time period for clearing $DR_B$.

(8) "SFTGT" is a signal to be supplied to the data controller 15 and a pulse f indicates a time period for loading of shift registers $DR_A$ and $DR_B$ and shift operation.

(9) "$\overline{RAS}$" is a signal in which $R_A$ indicates writing of data $D_A$ into address n and $R_B$ indicates writing of data $D_B$ into address $(n+1)$. The remaining $\overline{RAS}$ other than $R_A$ and $R_B$ is a signal for display read out.

(10) "$\overline{CAS}$" is a signal in which $C_A$ indicates writing of data $D_A$ into address n and $C_B$ indicates writing of data $D_B$ into address $(n+1)$. The remaining $\overline{CAS}$ other than $C_A$ and $C_B$ is a signal for display read out.

(11) "$\overline{WE}$" is a signal which is similar to $\overline{RAS}$ of (9) and $\overline{CAS}$ of (10).

(12) "WTADR" indicates an address to be supplied to the screen memory 22.

(13) "WTDATA" is a signal having a period g for shift operation and this period g changes depending upon the amount of shift. $D_A$ and $D_B$ indicate timing for writing data.

(14) "MRDY" is a response signal from the I/O controller 13 to the control bus 8C in response to the write request signal MWTC of (4) and it indicates the completion of operation at the CRT display device side for MWTC. A time period between points h' and j' as indicated by the dotted line indicates a response timing in the case when writing into address $(n+1)$ is omitted.

(15) "DGA" is a signal to be supplied to the data controller 15 and it is a gate signal for writing data $D_A$ into address n.

(16) "$\overline{DGB}$" is a signal to be supplied to the data controller 15 and it is a gate signal for writing data $D_B$ into address $(n+1)$.

(17) "AD+1" is a signal to be supplied to the address controller 14 and it is used to cause the address to proceed to $(n+1)$.

FIGS. 20b-1 and 20b-2, when combined as indicated in FIG. 20b, define a timing chart which indicates the functional relation among the write command MWTC supplied from CPU, the response signal MRDY responsive to the write command MWTC and D flipflop circuits FF11-FF12 and FF21-FF27 and which also indicates that the write operation is carried out twice, once for address n and once for address $(n+1)$, in response to a single write command. Among the wave forms shown in FIG. 20b, those from (1) "$Q_B$" to (4) "MWTC" and (16) "MRDY" are identical to those shown in FIG. 20a. And, FF11-Q through FF12-Q and FF21-Q through FF27-Q indicate output signals at output terminals Q of respective D flipflop circuits, and U22-OUT through U24-OUT indicate output signals from respective NAND gate circuits U22 through U24. The operational timing of D flipflop circuits in FIG. 19 is as indicated in the timing chart of FIG. 20b and they generate signals such as (6) "DBUSENM", (7) "SFTLD", (8) "SFTGT", (15) $\overline{\text{DGA}}$, (16) $\overline{\text{DGB}}$ and (17) AD+1 of FIG. 20a.

A portion of signal (9) U24-OUT of FIG. 20b which is indicated by the dotted line signifies the condition that there is no output $S_{OUT}$ from the shift register SC in FIG. 19, and, thus, it indicates the level when LSB of mask register $MR_A=0$ and the shift amount equals "0". In this case, since an output of NAND gate circuit U23 becomes a clock input to the D flipflop circuit FF22 through the NOR gate circuit U51, its output FF22-Q changes to Lo level at the timing of k' of (10) in FIG. 20b. On the other hand, if LSB of mask register $MR_A$ is not equal to 0, then timing of k shifts in accordance with a shift amount.

Timing a and b of (4) write command MWTC in FIG. 20b is asynchronous with the clock of CRT display device, e.g., (1) $Q_B$, and it is generated by the timing of CPU. In particular, timing b corresponds to timing h to generate the response signal MRDY, and after the generation of h, MWTC is caused to return to Hi level by the timing b of CPU. Accordingly, a time period from h to b is not constant and it varies within a range of predetermined time span.

As described already, in the case of shift write operation, using the system bus 8 of FIG. 2, address of screen memory 22 is supplied from the address bus 8A through the address buffer 11 and mask data $D_{0-15}$ of mask register MR incorporated in the I/O controller 13 is supplied from the data bus 8B through the data buffer 12 with the write request signal MWTC being supplied to FF11 of I/O controller 13 from the control bus 8C. With reference to the timing charts of FIGS. 20a and 20b, the operation of an associated portion in the I/O controller 13 of FIG. 19 will be described below.

When the write request signal MWTC is input at time a in FIGS. 20a and 20b, FF11 operates at the time when the next clock signal $Q_B$ is input, thereby causing its output Q to be inverted to "Lo". The write request signal MWTC is at the same time supplied to the 3-input NAND gate U26 and to the NAND gate U29 through the inverter U61. A signal WTGT-1 is a condition signal which skips the write operation into address (n+1) and to return the termination signal MRDY upon completion of writing into address n if the shift amount set in the mask register $MR_A=0$ and writing is completed only for address n as in the case of inputting a half-sized character as indicated in FIG. 16. In the case when the operation is completed just by writing data into address n, the inverter U65, AND gate circuits U13 and U14 and OR gate circuit U43 function to connect the D flipflop circuit FF24 to FF27. On the other hand, in the case when the operation is to be completed after carrying out the write operation twice, once for address n and once for address (n+1), they function to connect D flipflop circuit FF26 to FF27.

If shift amount m=0, then LSB of $MR_A$ of FIG. 11 is equal to 0. Thus, the NAND gate circuit U21 detects the fact that LSB of $MR_A$ is equal to "0". In the case of shift write mode of operation, LSB is not equal to 0 and an erase mode signal "ESMD" is "0", i.e., "Lo", so that the NAND condition of NAND gate circuit U21 is not established. If shift amount m=0 and LSB=0, then the NAND condition is established so that the NAND gate circuit U21 changes to "Lo". Therefore, the OR gate circuit U41 outputs a signal "WTGT-1" having the state "1", which is supplied to an input terminal D of FF27 through the AND gate circuit U13 and OR gate circuit U43. Accordingly, when clock $\overline{Q}_D$ is input, i.e., at the time when the write operation of 16 bits is completed as indicated by (15) $Q_D$ in the timing chart of FIG. 3, FF27 is inverted thereby causing its output $\overline{Q}$ to be "Hi". Thus, the write termination signal MRDY output from the NAND gate circuit U29 changes to "Lo" thereby producing a response signal indicating completion of write operation.

Now, if a half-sized character falls completely onto address n, then MSB of $MR_A$ of FIG. 16 is set to be 1. In this case, the output from the inverter U62 is inverted to be "0" and the signal WTGT-1 output from the OR gate circuit U41 is supplied in the state of "1". Thus, similarly with the previous case of shift amount m=0, at the time of completion of writing data into address n, the termination signal MRDY is returned. As regards the timing j of MRDY, in response to timing b of MWTC, when MWTC changes from "Lo" to "Hi", MRDY also changes from "Lo" to "Hi".

A relation between MWTC and MRDY will be described in detail below.

(1) If MRDY=Hi, then reception of MWTC is possible.

(2) Upon reception of MWTC, when the operation at the side of CRT display device in response thereto is terminated or preparation to terminate is completed, MRDY changes from Hi level to Lo level.

(3) Upon detection of changes in the level of MRDY from "Hi" to "Lo", the CPU causes MWTC to change from Lo level to Hi level at the timing of CPU.

(4) Upon detection of changes in level of MWTC from "Lo" to "Hi", the CRT display device causes MRDY to change from Lo level to Hi level.

It is so structured that the CPU and the CRT display device operate with the above-described interface conditions (1) through (4).

The NAND gate circuit U22 in FIG. 19 is a circuit to preset the D flipflop circuits FF21 through FF27 in preparation for a second command signal MWTC which might occur next upon termination of one write command MWTC, namely when it has been changed from Lo level to Hi level.

A signal (17) U22-OUT in FIG. 20b is generated on the basis of (5) FF11-Q and (6) FF12-Q to preset FF21 through FF27. This preset function has a meaning of initializing the circuit for the purpose of receiving the next command MWTC after the write command MWTC has returned to Hi level at timing b. Moreover, the NAND gate circuit U21 is provided to function so as not to skip the write operation in such address (n+1) when the entire screen or part of screen is to be erased thereby allowing to increase the erase speed. In this erase operation, the erase mode signal ESMD is set in the state of "1" ("Hi" level), thereby securing that no NAND condition is established for the NAND gate circuit U21 even if LSB of $MR_A=0$.

Then, by setting all bits of mask registers $MR_A$ and $MR_B$ "0" and all bits of input data "0", two words of data in addresses n and (n+1) may be erased by a single write command MWTC. It is to be noted that setting all of bits of mask registers $MR_A$ and $MR_B$ is not always necessary. Because, in accordance with the data write-in method of this invention, it is intended to form a synthesized data by selecting read data from address n (and n+1) of screen memory 22 and input data by the mask data set in the mask registers $MR_A$ and $MR_B$ and store it into the same address n (and n+1) thereby setting the input data all "0", so that the bits in which a resultant data produced by shifting this data at least by the shift registers $DR_A$ and $DR_B$ is present are set "0" irrespective of the contents set in $MR_A$ and $MR_B$. Thus, if the bits of $MR_A$ and $MR_B$ which correspond to those bits other than the bits having the resultant data of $DR_A$ and $DR_B$ are set "0", two words of addresses n and (n+1) may be similarly erased by a single write command MWTC.

As shown in FIG. 2, the data controller 15 receives input data $D_0$–$D_{15}$, read data $RD_0$–$RD_{15}$ supplied through the output selector 23 after having been read out of the screen memory 22 and mask information $MDA_0$–$MDA_{15}$ and $MDB_0$–$MDB_{15}$ supplied from mask registers $MR_A$ and $MR_B$ in the I/O controller 13. At the data controller 15, the input data $D_0$–$D_{15}$ are shifted by m in accordance with mask information $MDA_0$–$MDA_{15}$ and $MDB_0$–$MDB_{15}$ and combines the read data $RD_0$–$RD_{15}$ with the shifted input data $D_0$–$D_{15}$ to form write data $WD_0$–$WD_{15}$. This operation is continuously carried out to addresses n and (n+1) of screen memory 22 by a single write request command MWTC.

In the timing chart of FIG. 20a, particularly the operation indicated by WTAD–WTDATA and $\overline{DG}$-A-$\overline{DG}$-B is carried out by the data controller 15. During the time period g of WTDATA, the shift operation is carried out; whereas, writing of combined data into address n is carried out at $D_A$ and writing of combined data into address (n+1) is carried out at the following $D_B$.

Figure 21:
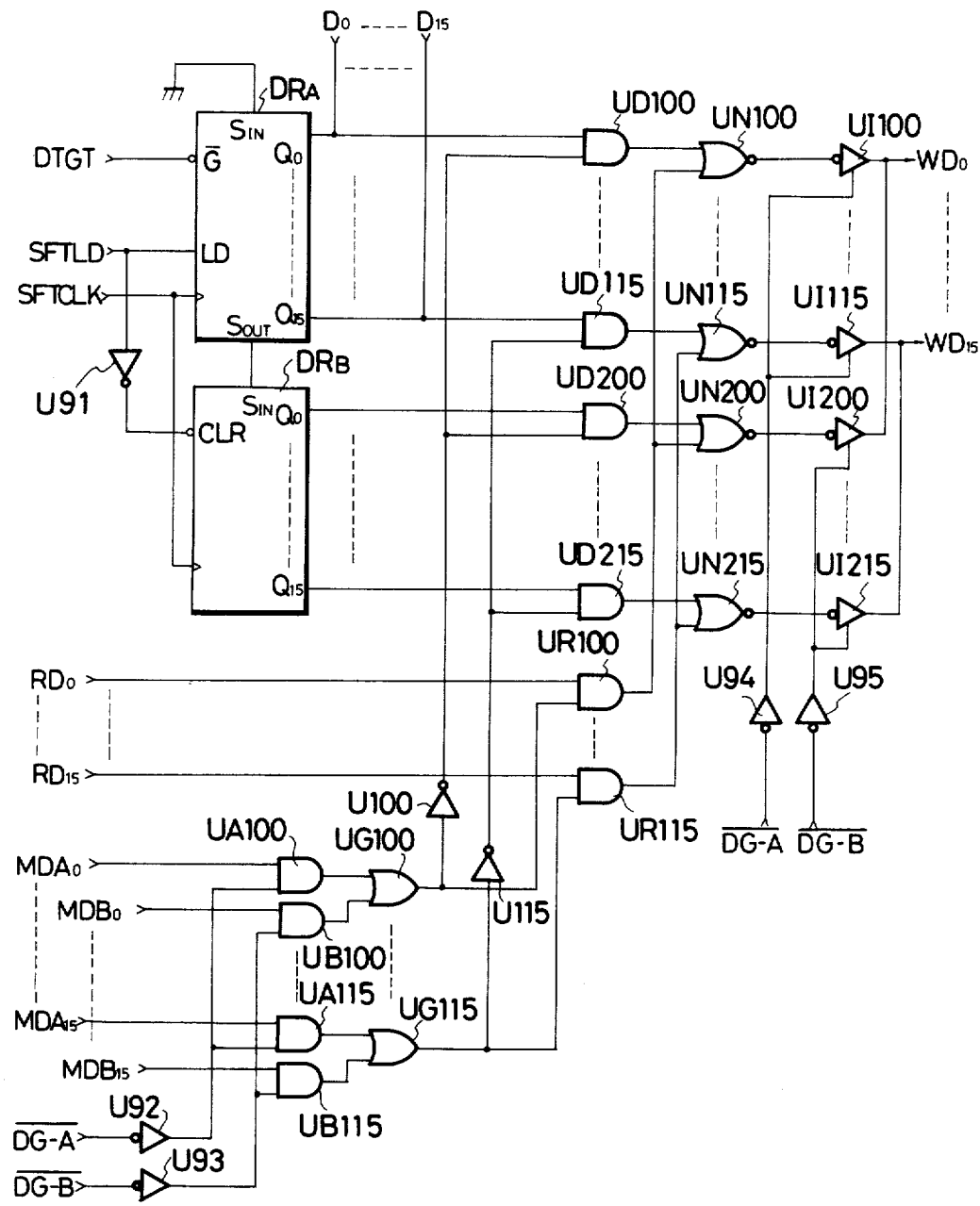
FIG. 21 is a schematic illustration showing the detailed structure of data controller.

FIG. 21 shows an example of the detailed structure of data controller 15. As shown, it includes a shift register $DR_A$ capable of serial input/output as well as parallel input/output, a serial-in-parallel-out shift register $DR_B$, AND gate circuits UD100–UD115 connected to respective inputs $Q_0$–$Q_{15}$ of $DR_A$, NOR gate circuits UN100–UN115 and UN200–UN215, gated inverters UI100–UI115 and UI200–UI215, AND gate circuits UR100–UR115 to which read data $RD_0$–$RD_{15}$ are input respectively from the memory, AND gate circuits UA100–UA115 to which output data $MDA_0$–$MDA_{15}$ from the mask register $MR_A$ are respectively input, AND gate circuits UB100–UB115 to which output data $MDB_0$–$MDB_{15}$ from the mask register $MR_B$ are respectively input, OR gate circuits UG100–UG115 to which outputs from the AND gate circuits UA100–UA115 and UB100–UB115 are respectively input, inverters U100–U115 which receive outputs from the OR gate circuits UG100–UG115 to control the gates of AND gate circuits UD100–UD115 and UD200–UD215, and inverters U91–U95.

It is to be noted that FIG. 21 is shown with simplification so as to allow to understand the structure of data controller 15 clearly. That is, only $D_0$ and $D_{15}$ among input data $D_0$–$D_{15}$ supplied from CPU are shown. Similarly, $MDA_0$ and $MDA_{15}$ among mask data $MDA_0$–$MDA_{15}$ input from the mask register $MR_A$, $MDB_0$ and $MDB_{15}$ among mask data $MDB_0$–$MDB_{15}$ input from the mask register $MR_B$, and $RD_0$ and $RD_{15}$ among read data $RD_0$–$RD_{15}$ from the screen memory are only shown in FIG. 21. As regards the shift registers $DR_A$ and $DR_B$, only $Q_0$ and $Q_{15}$ among their input/output terminals $Q_0$–$Q_{15}$ are explicitly shown. Then, in order to clearly indicate the significance of in-between bits which have not been shown explicitly, each of the elements forming the logic circuits is designated by a 3-digit numeral whereby the bottom two digits are used corresponding to 0–15. In other words, excepting the inverters U91–U95, although omitted from FIG. 21, there are, in fact, provided logic circuits for bits 1–14 similarly with the logic circuits for bits 0 and 15 for each of the elements.

In operation, at the shift register $DR_A$, when the load signal SFTLD is "Hi", input data $D_0$–$D_{15}$ are loaded by clock SFTCLK in parallel into inputs $Q_0$–$Q_{15}$, respectively. The input data $D_0$–$D_{15}$ is supplied from the data buffer 12. Then, when SFTLD is "Lo", the shift operation is carried out by clock SFTCLK to generate output $S_{OUT}$. If control signal DTGT is "Lo", then input $Q_0$–$Q_{15}$ are switched to an output mode. Input $S_{IN}$ of shift register $DR_B$ is connected to output $S_{OUT}$ of shift register $DR_A$. At the shift register $DR_B$, while load signal SFTLD is "Hi", when an inverted output by the inverter U91 is supplied to a clear terminal CLR, the outputs $Q_0$–$Q_{15}$ are cleared. While SFTLD is "Lo", i.e., terminal CLR being "Hi", the shift operation is carried out by clock SFTCLK.

Gate signal DTGT is a signal which controls the direction of data buffer 12, that is whether data is to be input into the system bus side or data is to be output from the system bus side, and this gate signal DTGT is supplied to a terminal $\overline{G}$ of shift register $DR_A$. Gate control signal $\overline{DG\text{-}A}$ is a signal for controlling writing of combined data $D_A$ into address n and $\overline{DG\text{-}B}$ is a signal for controlling writing of combined data $D_B$ into address (n+1).

Figure 22:
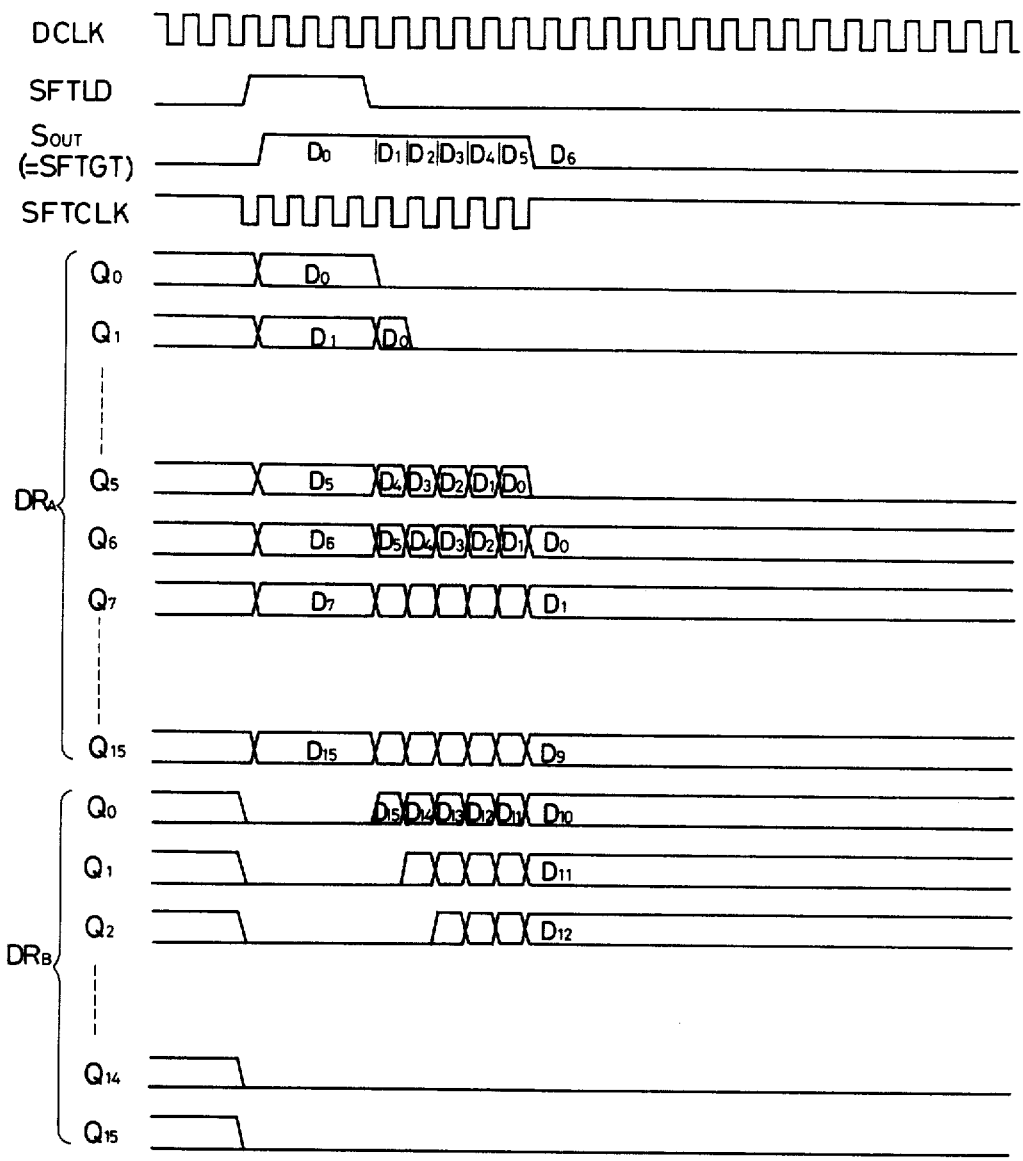
FIG. 22 is a timing chart which is useful for understanding the operation of shift register in the I/O controller and of shift register in the data controller.

FIG. 22 is a timing chart indicating the operation of shift controller SC in the I/O controller 13 and the shift registers $DR_A$ and $DR_B$ of data controller 15. FIG. 22 shows the case with shift amount m=6.

As shown, when signal SFTLD becomes "Hi", input data $D_0$–$D_{15}$ from the data buffer 12 is loaded into the input/output $Q_0$–$Q_{15}$ of shift register $DR_A$ of FIG. 21. At the same time, the shift register $DR_B$ is cleared with its output $Q_0$–$Q_{15}$ set to "Lo" level. Since m=6 in the illustrated example, output SFTGT from the shift controller SC is input as being "Hi" only during a time period for carrying out the shift operation by 6 bits. As a result, the input data $D_0$–$D_{15}$ is shifted by 6 bits from the shift register $DR_A$ to the shift register $DR_B$ in association with clock SFTCLK and the shift operation is completed under the condition indicated in FIG. 22. That is, $D_0$–$D_9$ are set in $Q_6$–$Q_{15}$ of $DR_A$ and $D_{10}$–$D_{15}$ are set in $Q_0$–$Q_5$ of $DR_B$, respectively, and this condition is maintained until completion of writing into addresses n and (n+1).

The previously described time period g of WTDATA in FIG. 20 is a time period during which such a shift operation is carried out, and its length is increased or shortened depending upon shift amount m.

It will now be described as to the operation for forming data to be written into the screen memory below. Read data $RD_0$–$RD_{15}$ from the screen memory 22 is supplied from the output selector 23. While writing into address n, read data $RD_0$–$RD_{15}$ from address n is input, and m-bit read data $RD_0$–$RD_m$ corresponding to mask information $MDA_0$–$MDA_{15}$ set with "1" in $MR_A$ of FIG. 11 is selected by the AND gate circuits UR100–UR115. The remaining (16−m)-bit data set with "0" in $MR_A$ is generated from output $Q_0$–$Q_{15}$ of shift register $DR_A$ and selected by the AND gate circuits UD100–UD115. With the m-bit data from the AND gate circuits UR100–UR115 and the (16−m)-bit data from the AND gate circuits UD100–UD115, write data WD$_0$–WD$_{15}$ to address n is synthesized.

During writing data into address n, as indicated in the timing chart of FIG. 20a, the gate control signal $\overline{DG\text{-}A}$ changes to "Lo" and is supplied to the inverters U92 and U94 in FIG. 21. The inverter U92 is connected to AND gate circuits UA100–UA115 to which mask information MDA$_0$–MDA$_{15}$ is input from the mask register MR$_A$ and their gates are opened. As indicated in FIG. 11, mask information MDA$_0$–MDA$_{15}$ is given such that the bit corresponding to shift amount m is "1" and the bit into which input data D$_0$–D$_{15}$ is written is "0". The mask information MDA$_0$–MDA$_{15}$ is supplied to the AND gate circuits UR100–UR115 and inverters U100–U115 through the AND gate circuits UA100–UA115 and OR gate circuits UR100–UR115.

The AND gate circuits UR100–UR115 are gate circuits which select read data RD$_0$–RD$_{15}$ and they select only those read data RD$_0$–RD$_{15}$ in which mask information MDA$_0$–MDA$_{15}$ correspond to "1" to supply the thus selected data to the NOR gate circuits UN100–UN115 and UN200–UN215. Thus, among the read data RD$_0$–RD$_{15}$ from address n of the memory, only the m-bit read data which is not rewritten is selected and supplied to the gated inverters UI100–UI115 and UI200–UI215 through the NOR gate circuits UN100–UN115 and UN200–UN215. On the other hand, the mask information MDA$_0$–MDA$_{15}$ inverted by the inverters U100–U115 is supplied to the AND gate circuits UD100–UD115 which select outputs Q$_0$–Q$_{15}$ of shift register DR$_A$ and to the AND gate circuits UD200–UD215 which select outputs Q$_0$–Q$_{15}$ of shift register DR$_B$.

As indicated in FIG. 11, for mask information MDA$_0$–MDA$_{15}$, the bit corresponding to a write-in position is "0" and the bit corresponding to shift amount m is "1", so that the bit "0" corresponding to the write-in position is inverted to "1" by the inverters U100–U115. As a result, those AND gate circuits UD100–UD115 and UD200–UD215 which correspond to the write-in position are selected and their gates are opened.

During writing operation into address n, the input data D$_0$–D$_{15}$ set in the shift register DR$_A$ is written in. Then, as described with reference to FIG. 22, the data is maintained in the condition of being shifted by shift amount m, e.g., 6 bits. That is, the position corresponding to "0" at the LSB side of mask information MDA$_0$–MDA$_{15}$ corresponds to the set position for input data D$_0$. Thus, among outputs Q$_0$–Q$_{15}$ from shift register DR$_A$, (16 − m) bits from D$_0$ side in the input data D$_0$–D$_{15}$ are selected by the AND gate circuits UD100–UD115 and output by the NOR gate circuits UN100–UN115.

Gate control signal $\overline{DG\text{-}A}$ is also supplied to the gated inverters UI100–UI115 through the inverter U94 at the same time. Thus, with the signal $\overline{DG\text{-}A}$ inverted to "Hi" by the inverter U94, the gated inverters UI100–UI115 are opened so that output from the NOR gate circuits UN100–UN115 is output as write data WD$_0$–WD$_{15}$ through the gated inverters UI100–UI115. With such an operation, a selection is made for read data RD$_0$–RD$_{15}$ corresponding to m bits set by "1" in mask register MR$_A$ in FIG. 11 and a selection is also made for input data D$_0$–D$_{15}$ corresponding to (16 − m) bits set by "0" in MR$_A$, so that write data WD$_0$–WD$_{15}$ to address n is obtained.

On the other hand, during a writing operation into the next address (n + 1), read data RD$_0$–RD$_{15}$ from address (n + 1) is input and a selection is made similarly by the AND gate circuits in accordance with mask information MDB$_0$–MDB$_{15}$ which is set by "1" in MR$_B$ in FIG. 11. In this case, there is obtained data which corresponds to (16 − m) bits. The remaining m-bit data is selected from output Q$_0$–Q$_{15}$ of shift register DR$_B$ by the AND gate circuits UD200–UD215. In this case, there is obtained data from output Q$_0$–Q$_m$. In this manner, write data WD$_0$–WD$_{15}$ into address (n + 1) is synthesized from m-bit data from the AND gate circuits UD200–UD215 and (16 − m)-bit data from the AND gate circuits UR0–UR15.

When the address is incremented to establish a writing operation into address (n + 1), the gate control signal $\overline{DG\text{-}A}$ again returns to "Hi" and $\overline{DG\text{-}L}$ changes to "Lo". In this case, outputs from the inverters U93 and U95 in FIG. 21 are rendered valid. Accordingly, the AND gate circuits UB100–UBI15 for selecting mask information MDB$_0$–MDB$_{15}$ from the mask register MR$_B$ are opened by the inverted output from the inverter U93. Then, mask information MDB$_0$–MDB$_{15}$ from the mask register MR$_B$ shown in FIG. 11 is output from the OR gate circuits UG100–UG115. Then, only those of read data RD$_0$–RD$_{15}$ from address (n + 1) which correspond to bits given by "1" in mask information MDB$_0$–MDB$_{15}$ are selected by the AND gate circuits UR100–UR115 and then input to the gated inverters UI200–UI215 through the NOR gate circuits UN200–UN215.

Those of the AND gate circuits UD100 ∝ UD115 and UD200–UD215 which correspond to bits set to be "0" in MR$_B$ of FIG. 11 are selected by the mask information MDB$_0$–MDB$_{15}$ inverted by the inverters U100–U115.

During writing into address (n + 1), the input data D$_0$–D$_{15}$ retained in the shift register DR$_B$ is written in.

As shown in the timing chart of FIG. 22, at output Q$_0$–Q$_{15}$ of shift register DR$_B$, m-bit data among the input data D$_0$–D$_{15}$ shifted from the shift register DR$_A$ (in this case, m bits from D$_{15}$ side of D$_{15}$–D$_0$) is retained. Those bits of mask information MDB–MDB$_{15}$ which correspond to these shifted m bits are "0" as indicated in FIG. 11. Thus, "1" in the mask information inverted by the inverters U100–U115 is present only for those m bits, and, thus, m-bit output Q$_0$–Q$_m$ among output Q$_0$–Q$_{15}$ of shift register DR$_B$ is selected by the AND gate circuits UD200–UD215.

During writing into address (n + 1), the gated inverters UI200–UI215 are rendered valid by an output from the inverter U95. As a result, by the mask information indicated by MR$_B$ in FIG. 11, the data which corresponds in position to "0" by m bits is produced from output Q$_0$–Q$_m$ of shift register DR$_B$ and the remaining (16 − m) bit data which corresponds in position to "1" is produced from read data RD$_{m+1}$–RD$_{15}$ from the memory 22 so that write data WD$_0$–WD$_{15}$ to address (n + 1) is synthesized.

As described above, in accordance with the present data write-in method, in response to a single write request MWTC from the system bus side, writing is carried out twice, once for address n and once for address (n + 1), and thereafter the termination signal MRDY is supplied to the system side. Accordingly, when viewed from the system side, it is nothing but an operation for writing a single data into a single address so that processing at the system side is quite simple and writing speed is significantly increased.

Now, alternative embodiments will be described below.

FIG. 23 shows an alternative arrangement of dot matrix in which one character is defined by 24 dots by 24 dots. In such a case where each line $l=0-23$ includes 24 bits as indicated in FIG. 23, a writing operation may be carried out such that 16 bits (=one word) of b=0 to b=15 are first written into the screen memory 22 in a manner similar to the previously described method and then 8 bits (=one byte) of b=16 to b=23 are written. In this case, "0" indicating selection of input data is given for 24 bits of the mask information to be supplied to the mask registers $MR_A$ and $MR_B$, but this is fundamentally the same as the previous embodiment. If shift amount m is in a range between 10 and 15, addresses of screen memory 22 for which writing is to be carried out are n, (n+1) and (n+2), and, thus, a writing operation into address (n+2) will be carried out upon completion of writing operation for 24 lines in addresses n and (n+1).

It will now be described at to the case in which a ruled line is to be drawn.

FIG. 24 schematically illustrates the conceptual structure of screen memory in which a vertical ruled line is drawn between two Japanese characters "item" (left-hand side) and "pencil" (right-hand side). In this case, the vertical ruled line having a 1-bit width is drawn at a position shifted by $m_3$ bits (m=0, 1, 2, ..., 15) from the address boundary. FIG. 25 shows an example indicating how the mask register $MR_A$ is set for drawing the vertical ruled line in a manner shown in FIG. 24. As shown in FIG. 25, "0", which indicates to select input data, is set by only one bit at a position shifted by $m_3$ bits from LSB of mask register $MR_A$. In correspondence with this "0" bit data, "1" is set in the corresponding bit in the shift register $DR_A$ for input data, so that the vertical ruled line may be drawn without influencing the remaining character data.

On the other hand, supposing that the vertical ruled line is already set as indicated in FIG. 24, if it is desired to erase only this ruled line, it is only necessary to set the bit corresponding in position to the ruled line on the screen memory to "0" and to set the corresponding bit in input data also to "0". In this manner, erasure only of ruled line may be carried out without affecting the other character data.

Figure 26:
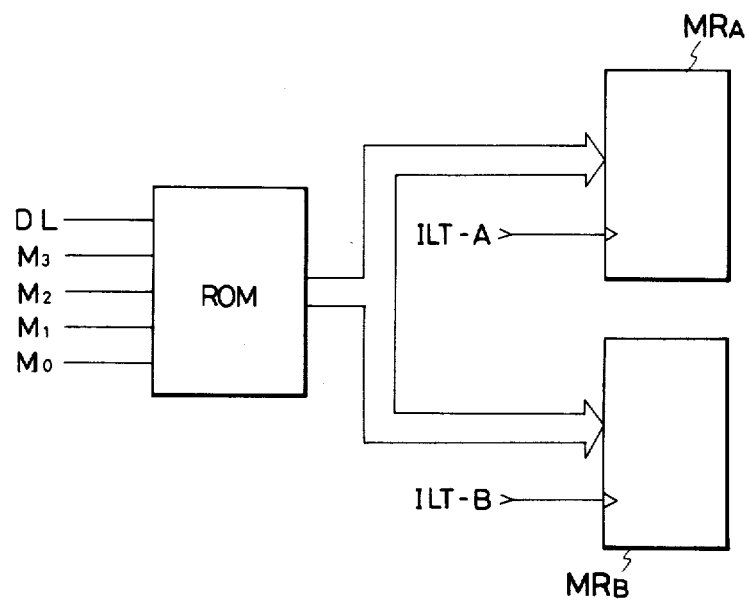
FIG. 26 is a block diagram showing a circuit in which mask information is set in the mask register using a read only memory (ROM)

As an alternative approach, a ROM may be used for setting mask information into mask registers $MR_A$ and $MR_B$. FIG. 26 shows in block form a circuit for setting mask information into mask registers $MR_A$ and $MR_B$ using a ROM. It is to be noted that identical reference characters indicate identical elements as in FIG. 18. ROM is a read only memory storing 16 kinds of shift amounts 0–15 and DL is a signal indicating the size of write-in data, i.e., 16 bits (=one word) or 8 bits (=one byte). $M_0-M_3$ define a code data which signifies shift amount 0–15.

In the circuit of FIG. 26, shift information indicating one of 16 different kinds of shift amounts 0–15, defined in the form of a 4-bit code data $M_0-M_3$, is supplied to the ROM from the system bus side. Signal DL indicating the size of data to be written is also supplied to the ROM. Therefore, mask information corresponding to a given shift amount is set in the mask registers $MR_A$ and $MR_B$ from the ROM. These shift information $M_0-M_3$ and information DL are supplied to the I/O controller 13 from the system bus side prior to write-in data, address information and write command and set in the mask registers $MR_A$ and $MR_B$.

The shift write operation for the screen memory 22 may be implemented by carrying out chip select for the memory elements in the screen memory instead of using the read/modify/write cycle described above with reference to FIGS. 13 and 14.

Figure 27:
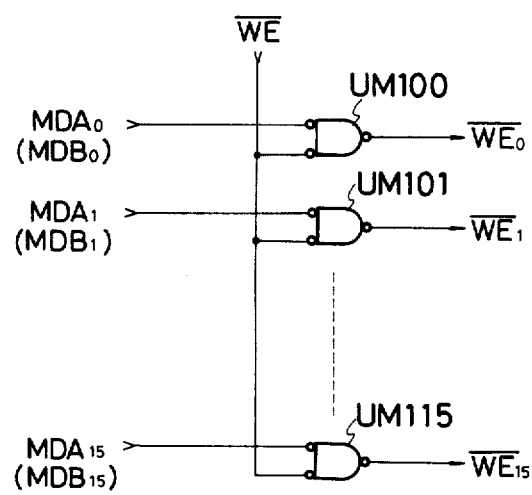
FIG. 27 is a schematic illustration showing an example of chip select circuit.

FIG. 27 shows one example of such a chip select circuit. In FIG. 27, UM100–UM115 designate NAND gate circuits; $MDA_0-MDA_{15}$ designate mask information from the mask register $MR_A$; $MDB_0-MDB_{15}$ designate mask information from the mask register $MR_B$; $\overline{WE}$ designates write command; and $\overline{WE}_0-\overline{WE}_{15}$ designate chip select signals for the memory elements defining the screen memory 22. With the circuit of FIG. 27, gate may be applied to $\overline{WE}$ depending on the conditions of mask register $MR_A$ or $MR_B$, thereby allowing to write only required bits from the data shifted by the shift registers $DR_A$ and $DR_B$. Thus, with the provision of the chip select circuit shown in FIG. 27, a chip select function may be provided and thus, if so, there is no need to access the memory using the read/modify/write cycle described with reference to FIG. 14.

Figure 28:
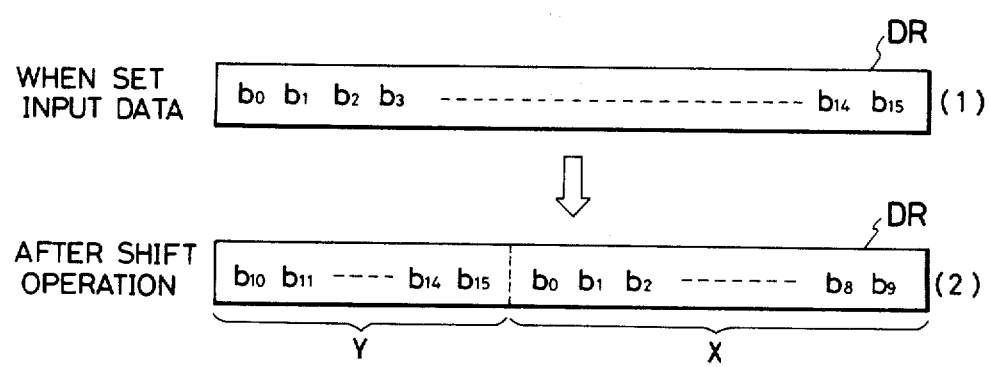
FIG. 28 is a schematic illustration showing an alternative structure of shift register when formed as a cyclic register.

FIG. 28 shows another embodiment of a shift register which may be advantageously used in the present invention. In FIG. 28, a shift register DR contains input data $b_0-b_{15}$ and X and Y indicate first and second areas after shift. In operation, using a cyclic register as the shift register DR, the input data is set as indicated in FIG. 28 (1). Then, the data set is shifted in accordance with a shift amount set in the mask register, as indicated in FIG. 28 (2). Since the shift register of FIG. 28 (2) corresponds to the shift register $DR_A$ or $DR_B$ of FIG. 21, the data in the X area after shift, i.e., input data $b_0-b_9$, is stored into address n and the data in the Y area after shift, i.e., input data $b_{10}-b_{16}$, is stored into address (n+1). With the use of such a cyclic shift register DR, the shift register may be constructed from one piece.

It is to be noted that a DMA controller may be added to the structure shown in FIG. 1, and, if added, data may be transferred from the character pattern memory to the screen memory of the CRT display device directly under the control of the DMA controller.

In the above-described embodiments, it has been described as to the case when the present invention has been applied to the CRT display device. However, the structure and operation of the CRT display device to which the present invention may be applied is not limited only to the circuit shown in FIG. 2, and the present invention may be applied equally to other CRT display devices. Moreover, the present invention may be applied to other data processing devices, such as a printer provided with a memory in which image information is stored with a pixel as a unit and read/write operation is carried out with a word as a unit.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method for writing data into a memory, in which data is written word by word and data is stored pixel by pixel, of a memory system for writing data into said memory by providing input data, its address and write command under the control of a CPU, said system including a shift register having a first area, into which said input data is set, and a second area; a mask register into which input mask data is set; and an address adder for adding a predetermined number to a first input address to generate a second address, said method comprising the steps of:
- shifting the data set in said shift register to said second area in accordance with the data set in said mask register;
- writing the data in said first area into a first address of said memory at a first timing; and
- writing the data in said second area into a second address of said memory at a second timing.

2. The method of claim 1 wherein after setting said mask data in said mask register previously, said first address, input data and write command are provided.

3. A method for writing data into a memory, in which data is written word by word and data is stored pixel by pixel, of a memory system for writing data into said memory by providing input data, its address and write command and reading data by providing an address and read command under the control of a CPU, said system including a shift register having a first area, into which said input data is set, and a second area; a mask register into which input mask data is set; and an address adder for adding a predetermined number to a first input address to generate a second address, said method comprising the steps of:
- shifting the data set in said shift register to said second area in accordance with the data set in said mask register;
- reading data stored in a first address of said memory;
- forming first write data from said data from said first address and said data from said first area in accordance with a value of the data set in said mask register;
- writing said first write data thus formed into said first address of said memory at a first timing;
- reading data stored in a second address of said memory;
- forming second write data from said data from said second address and said data from said second area in accordance with the value of the data set in said mask register; and
- writing said second write data thus formed into said second address of said memory at a second timing.

4. The method of claim 3 wherein after setting said mask data in said mask register previously, said first address, input data and write command are provided.

5. A method for writing data into a memory, in which data is written word by word and data is stored pixel by pixel, of a memory system for writing data into said memory by providing input data, its address and write command under the control of a CPU, said system including a shift register having a first area, into which said input data is set, and a second area; a mask register into which input mask data is set; an address adder for adding a predetermined number to a first input address to generate a second address; and mask data judging means for judging a value of the data set in said mask register, said method comprising the steps of:
- shifting the contents of said shift register to said second area in accordance with the data set in said mask register;
- writing the data in said first area into a first address of said memory at a first timing; and
- determining as to whether or not to write the data in said second area into a second address of said memory at a second timing depending upon an output from said mask data judging means.

6. The method of claim 5 wherein after setting said mask data in said mask register previously, said first address, input data and write command are provided.

7. A method for writing data into a memory, in which data is written word by word and data is stored pixel by pixel, of a memory system for writing data into said memory by providing input data, its address and write command and reading stored data by providing an address and read command under the control of a CPU, said system including a shift register having a first area, into which said input data is set, and a second area; a mask register into which input mask data is set; an address adder for adding a predetermined number to a first input address to generate a second address; and mask data judging means for judging a value of the data set in said mask register, said method comprising the steps of:
- shifting the data set in said shift register to said second area in accordance with the data set in said mask register;
- reading data stored in a first address of said memory;
- forming first write data from said data from said first address and said data from said first area in accordance with a value of the data set in said mask register;
- writing said first write data thus formed into said first address of said memory at a first timing;
- reading data stored in a second address of said memory in accordance with an output from said mask data judging means;
- forming second write data from said data from said second address and said data from said second area in accordance with the value of the data set in said mask register; and
- determining as to whether or not to write said second write data thus formed into said second address of said memory at a second timing.

8. The method of claim 7 wherein after setting said mask data in said mask register previously, said first address, input data and write command are provided.

9. The method of claim 7 wherein when a write mode is a particular write mode, a detection signal generated from said mask data judging means is rendered invalid.

10. The method of claim 9 wherein after setting said mask data in said mask register previously, said first address, input data and write command are provided.

* * * * *